United States Patent [19]

Shimano et al.

[11] Patent Number: 4,835,730
[45] Date of Patent: May 30, 1989

[54] DATABASE DRIVEN ROBOT PROGRAMMING SYSTEM AND METHOD

[75] Inventors: Bruce E. Shimano; Clifford C. Geschke, both of Hacienda Heights; David W. Scarborough, Sunnyvale, all of Calif.

[73] Assignee: Adept Technology, Inc., San Jose, Calif.

[21] Appl. No.: 19,860

[22] Filed: Feb. 27, 1987

[51] Int. Cl.⁴ .................... G06F 15/46; G05B 19/42
[52] U.S. Cl. .................................. 364/513; 364/191; 364/900
[58] Field of Search .............. 364/513, 167, 171, 474, 364/475, 191–193, 200 MS File, 900 MS File, 300

[56] References Cited

U.S. PATENT DOCUMENTS

| | | | |
|---|---|---|---|
| 4,042,866 | 8/1977 | Morita et al. | 364/474 |
| 4,068,297 | 1/1978 | Komiya | 364/200 |
| 4,503,507 | 3/1985 | Takeda et al. | 364/513 |
| 4,534,001 | 8/1985 | Nozawa et al. | 364/900 |
| 4,577,284 | 5/1986 | Christy et al. | 364/513 |
| 4,633,385 | 12/1986 | Murata et al. | 364/191 |
| 4,636,938 | 1/1987 | Broome | 364/171 |
| 4,683,549 | 7/1987 | Takaki | 364/900 |

FOREIGN PATENT DOCUMENTS 1179782 12/1984 Canada ............................ 364/191

OTHER PUBLICATIONS

"Database Processing: Fundamentals, Design, Implementation," Kroenke, David, 1977, pp. 1–6.

*Primary Examiner*—Joseph Ruggiero
*Attorney, Agent, or Firm*—Flehr, Hohbach, Test, Albritton & Herbert

[57] ABSTRACT

A robot assembly system which uses a set of related databases to separately describe (1) what task is to be performed by the system, (2) details about how to perform the task (e.g., specifying the strategy routine to be used to insert a part into an assembly), and (3) data describing the workcell and object locations. The system includes software routines which control how each robotic operation is performed, but those aspects of each robotic operation which vary from part to part or from operation to operation are determined by the data in the databases. By keeping the what, how and where aspects of each assembly task separate, the present invention makes it possible to change them independently. Furthermore, the task to be performed by the system is typically defined by a Sequence database, which enables new tasks to be defined by simple, task level programming instructions, such as TRANSFER PART sn7400 TO u20.

21 Claims, 3 Drawing Sheets

DATABASE DRIVEN ROBOT PROGRAMMING SYSTEM AND METHOD

The present invention relates generally to robotic systems, and particularly to systems and methods for programming robots using a task level language.

BACKGROUND OF THE INVENTION

As recently as ten years ago, the vast majority of industrial robots were controlled by hard-wired logic electronics and were taught using simple teach and repeat methods. The robot "programs" created consisted primarily of instructions to move the robot to a taught location, generate an output signal, or wait for an external input signal. A typical program would consist of fewer than one hundred such instructions. For the most part, industrial robots were used to spot weld car bodies, spray paint, handle heavy objects, and service process machines such as machine tools, forges, and furnaces. For most of these applications, the simple controls provided with the robots were adequate to perform the required tasks and had the benefit of being easy to understand and program.

The needs of industry have changed, and today the majority of industrial robots sold in the United States are equipped with computer controls and robot programming languages. These new systems offer tremendous computational capabilities, equivalent to those found in conventional high-level computing languages. This computational ability is often combined with flexible input and output control, interfaces to vision systems and other types of sensory input, real-time motion control capability, and network communication facilities.

There has also been a dramatic shift in application emphasis. While spot welding is still the largest robot application segment, the small parts handling and assembly segment is the fastest growing area and is projected to become the largest application within the next few years. Unlike the jobs for which robots were previously used, these new applications do not merely benefit from the advanced capabilities of robot programming languages, they absolutely require them to achieve cost effective, reliable results.

For example, many applications now require vision systems to solve part presentation and fixturing problems. Other applications require that the robot interface directly with barcode readers, test equipment, and other intelligent devices. Fortunately, robot programming languages and systems are available to solve most of these problems. However, the solutions often require extremely complicated computer programs. A typical robot program now may consist of hundreds or thousands of conventional computer program instructions with only an occasional robot motion command. The introduction of robot programming languages has allowed the robotics industry to address new application areas, but the cost of this versatility has been a significant increase in programming effort.

The present invention provides a new approach to robot programming that greatly simplifies the integration, programming, and operation of robotic assembly cells. The preferred embodiment of the invention is called the Assembly and Information Management System (hereinafter called AIM), which is made by the assignee, Adept Technology, Inc. AIM allows, for the first time, programming of industrial robots using simple task-level statements such as "TRANSFER PART sn7404 TO u20".

The current best mode of the invention is a printed circuit board assembly system called AIM/PCB. The AIM system was also designed to handle other industrial processes, especially mechanical assembly (e.g., assembling electrical motors). The invention could also be adapted for other industrial processes such as chemical mixing and testing.

Design Philosophy and Objectives

The primary goal of the present invention is to greatly simplify the integration, programming, and operation of robotic assembly cells. Several key design philosophies and objectives were established to achieve this goal.

Separation of What, How, and Where

A robotic assembly task consists of three major functional aspects:

specification of what task is to be performed, details about how to perform the task, and data describing where the workcell and assembly objects are located.

In the prior art robotic systems known to the inventors, these three aspects are freely mixed, so that a change made to any single aspect requires that the entire software module be reviewed to ensure the other aspects have not been affected.

AIM was designed so that these three aspects are distinct and separate from each other, making it possible to change them independently. In particular, AIM uses a set of separated, interrelated databases to define a robotic assembly sequence by separately denoting the tasks to be performed, the positions of the locations which define the workcell, and data definging how each task is to be performed.

The specification of what should be done is captured in an "assembly sequence" database, which describes the assembly with task-level statements such as "TRANSFER part TO location". Data describing the workspace, parts, and assembly locations are stored in separate databases. Finally, there is a set of software routines which control how the assembly steps are performed.

The data describing the parts includes data which specifies the software routines to be used when moving each part. Furthermore, while the software routines control how the assembly steps are performed, those aspects of each type of step which vary from part to part (e.g., the speed at which the robot moves, and the location and angular position of the robot's arm when moving or performing a step) are determined by the data in the databases.

Task Level Programming Instructions

In the prior art industrial robot programming languages known to the inventors, each program instruction generates a single robot motion or action. For instance, one instruction is usually defined to open or close the hand. Another moves the robot between two points along a specified path. Still others test whether appropriate signals have been activated.

In the present invention the basic program instruction is called a "statement". A statement is a task-level instruction that initiates a series of motions and actions to perform an entire assembly task. For example, the most fundamental AIM/PCB statement is named "TRANSFER". TRANSFER performs a single, complete, pickand-place task. When executed, a single TRANSFER statement will initiate the following series of actions:

1. Move the robot along an optional path to the appropriate parts feeder or series of feeders.
2. Select the feeder and acquire the part.
3. Move along an optional path to an assembly location.
4. Insert the part into its assembly location.
5. If the assembly fails, discard the part to a reject bin.
6. Move the robot clear of the assembly area along an optional path.

Each of the above actions may comprise a complex series of robot motions, low-level actions, and tests. For example, acquiring a part from a feeder can involve testing and activating several external signals, performing several robot motions to approach the feeder, grasping the part, departing from the feeder, and retrying any actions that fail.

As indicated above, in the present invention the "what and where" aspects of each task are specified in a set of related databases. These databases also specify the software routines to be used to control each action performed by the robot. For example, each part to be handled will be defined by a separate record in a database called the PARTS database. The record for each part specifies a "part type", which identifies the software routines used to acquire the part from the feeder, to insert the part in an assembly, and (optionally) to discard the part if the system is unable to insert it into the assembly.

SUMMARY OF THE INVENTION

In summary, the present invention is a robot assembly system which uses a set of related databases to separately describe (1) what task is to be performed by the system, (2) details about how to perform the task (e.g., specifying the strategy routine to be used to insert a part into an assembly), and (3) data describing the workcell and object locations. The system includes software routines which control how each robotic operation is performed, but those aspects of each robotic operation which vary from part to part or from operation to operation are determined by the data in the databases. By keeping the what, how and where aspects of each assembly task separate, the present invention makes it possible to change them independently. Furthermore, the task to be performed by the system is typically defined by a Sequence database, which enables new tasks to be defined by simple, task level programming instructions, such as TRANSFER PART sn7400 TO u20.

Another aspect of the present invention, called walk through training, allows the details of an assembly sequence to be determined as the system performs the sequence. Typically, when setting up a new assembly sequence, the engineer will first define all aspects of the assembly sequence except the assembly locations, and possibly certain other locations (such as the position of a part feeder). Then the assembly sequence is executed with the system in in walk through training mode. The system stops and prompts the user for data values whenever an undefined data value is encountered. If the user sets an "edit all" flag while in walk through training, the system will also stop and prompt the user for data values whenever it encounters a data value which has been specially flagged as a value to be edited during walk through training.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
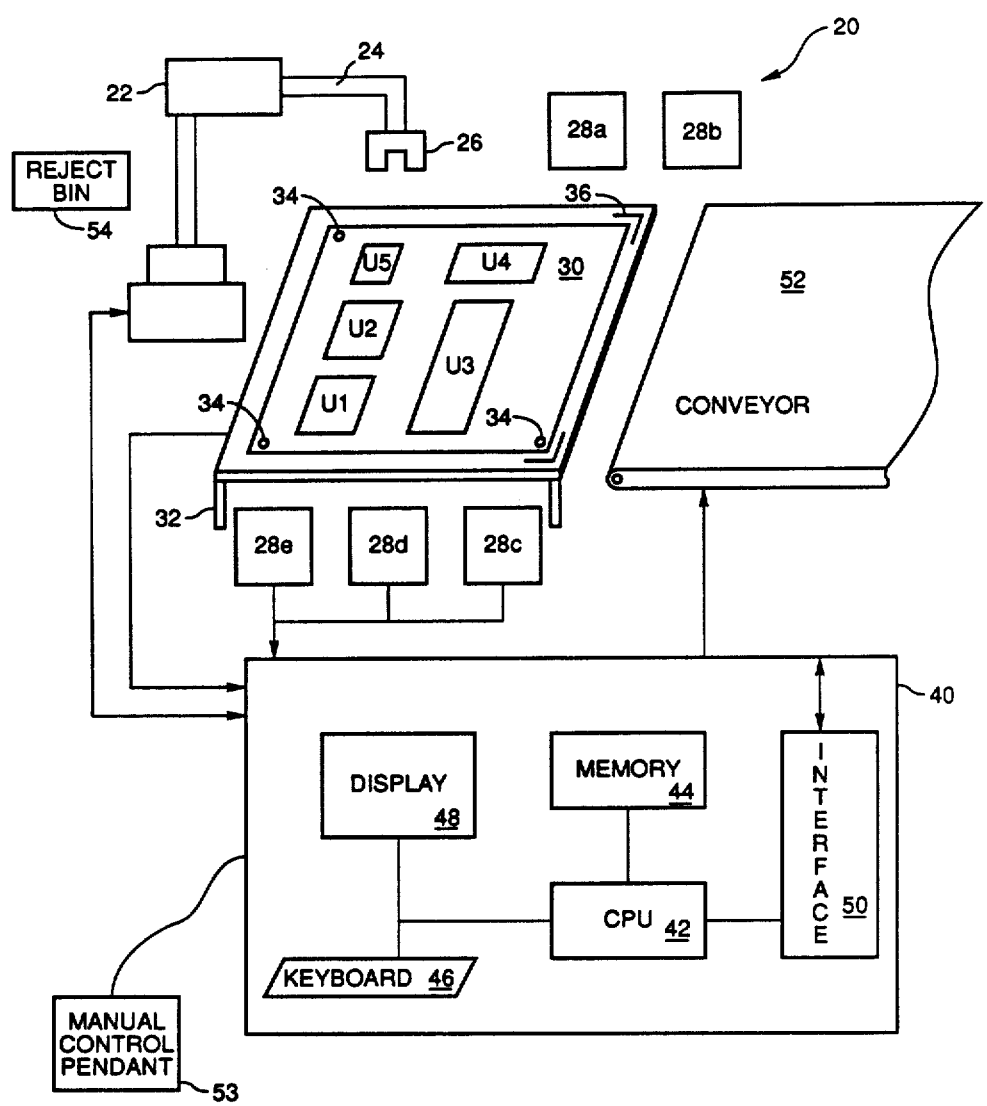
FIG. 1 is a block diagram of a robotic system incorporating the present invention.

Referring to FIG. 1, the preferred embodiment, herein called the AIM or AIM/PCB system, is an automated printed circuit board assembly system 20. This system includes a robot 22 having a moveable arm 24 with a tool 26 used for gripping parts. The robot assembles printed circuit boards by taking circuit components from specified feeders 28a–e and inserting them in specified sockets in a printed circuit board 30.

In the preferred embodiment, a conveyor belt feeds printed circuit boards 30 onto an assembly platform 32. To ensure that the board 30 is properly situated (i.e., located at a predefined position), the printed circuit board may have two or more alignment holes 34, and the platform 32 will include pushers 36 which move the printed circuit board 30 until pins in the platform can be inserted through these holes. In other systems, the pushers 36 can be used alone to align and hold the board in place.

Once a board is in place for assembly, the robot's controller 40 sends control signals to the robot 26 in accordance with a set of assembly instructions. The present invention concerns a new system and method for programming robotic systems which makes it easier to program and modify robotic tasks.

The controller 40 is a high capacity computer system, using a Motorola 68000 microprocessor as its central processing unit 42. It has a central processing unit (CPU) 42, memory 44 (including both random access memory and disk memory) for storing computer software and data, a control panel (sometimes called the operator's console) including a keyboard 46 and display 48 for communicating with the system's users, and an interface 50 for receiving and sending signals to the robot 22, feeders 28, platform 32 and conveyor 52. The system also includes a second control panel, called the manual control pendant 53, which is coupled to the system by a long flexible cable so that the user can walk around and observe the robot system while entering commands and reading feedback messages.

The system's workcell is defined by the locations of the feeders 28, the printed circuit board 30 and its sockets Ux. Other locations in the workcell may include a reject bin 54 for rejected parts, tool pickup locations (not shown), and paths used when moving from one location to another.

Figure 2:
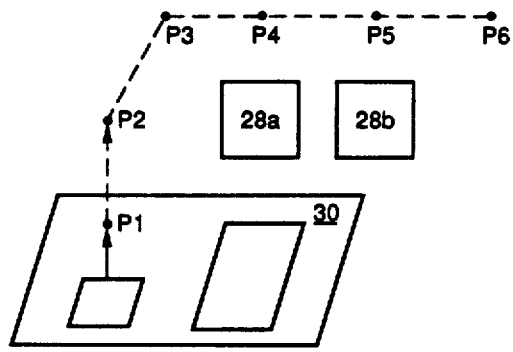
FIG. 2 schematically depicts a path.

A path, as shown in FIG. 2, is a series of points Px which define a trajectory to be used by the robot 22. As will be described below, paths can be specified in the preferred embodiment for each of several distinct portions of a task. Typically, paths are optional parameters that are specified when the robot might otherwise hit an object in the workcell while moving from one point to another. Paths are also used, for example, when acquiring a part from one of a number of feeders 28 to start the robot's arm 24 moving in a predefined direction (i.e., along a predefined path) toward the feeders while the controller 40 determines which feeder to use.

Figure 3A:
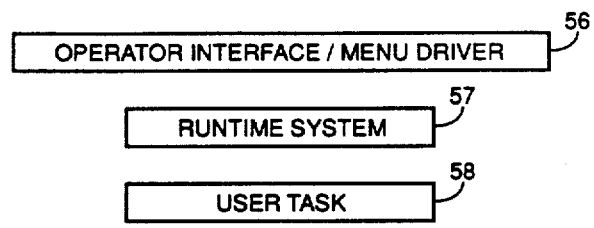
FIGS. 3A and 3B are a block diagrams of the software processes which run concurrently in the preferred embodiment.
Figure 3B:
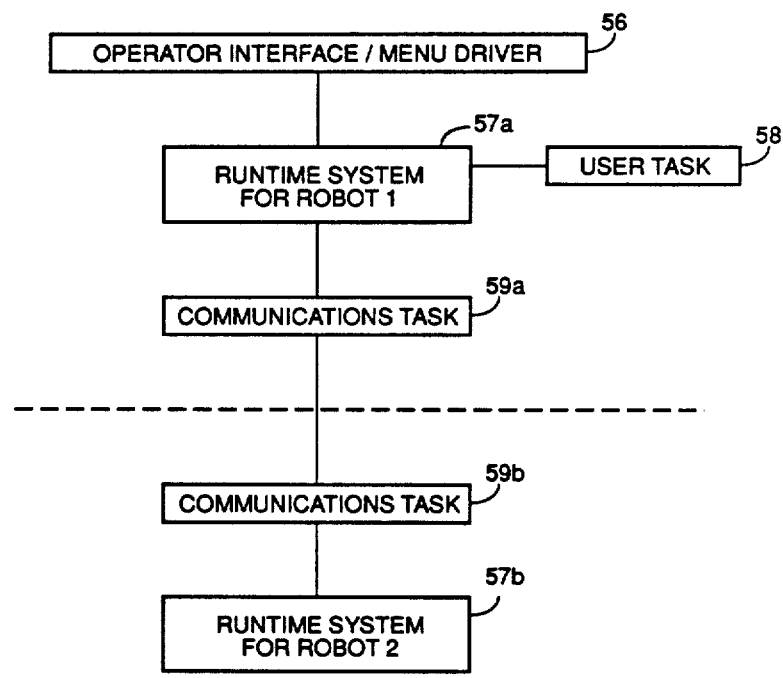

Referring to FIGS. 3A-3B, in the preferred embodiment, the controller 40 uses a multitasking operating system so that several software processes can be performed concurrently. In systems using a single robot, the controller runs three concurrent processes: an operator interface 56 which displays data and receives operator commands, a runtime system 57 which controls the assembly sequence being performed by the system, and an optional user taks 58 which can be used to asynchronously perform another task, such as setting up a clincher to bend the leads on an integrated circuit.

In systems with a second robot (i.e., in which two robots are used to perform assembly sequences), the second robot also has a controller with a multitasking operating system. Both systems include an additional communications task 59a and 59b for transmitting data back and forth between the system. In the preferred two robot embodiment, the second robot is set up so that it only performs steps when requested to do so by the first robot's runtime system. Messages from the second robot are displayed by the operator interface tasks (in the first robot's controller) on the same control panel as for the first robot.

The present invention primarily concerns the runtime system 57, and the manner in which robotic sequence are defined. Since one aspect of setting up robotic sequences in the preferred embodiment is a "walk through training mode" which involves interaction between the system's human operator and the runtime system 57, certain aspects of the operator interface are also described herein.

As will be described with reference to FIG. 4, the preferred embodiment of the present invention provides a set of data structures, each comprising a separate database, which are used to define a printed circuit board assembly sequence. By using this approach, an engineer can set up the assembly sequence for a new printed circuit board simply by creating a new sequence database and adding new data to the databases which define the elements of the assembly sequence. In other words, in most cases the engineer will not have to write any new software.

However, the field of robotic material handling and assembly is still so young that few, if any, standard hardware solutions are available. Consequently, each factory installation has its unique requirements and special mix of devices. Realizing this, AIM was not designed as a turnkey software system. Instead, the inventors developed a framework and a set of building blocks that can be easily enhanced and modified as necessary.

The framework consists of a database system for defining assembly sequences and components, and a menu-driven operator interface. The building blocks are software modules that perform primitive robot and sensory operations. Together they provide generic capabilities that are useful in all installations, and establish rules and procedures for adding enhancements in a uniform and consistent manner.

For instance, if an assembly sequence involves new tasks not previously programmed into the system, such as bending leads or using a new tool 26, these new tasks can also be specified in the databases—by indicating in the database the name of a new software program to be used at the appropriate point in the assembly sequence.

The AIM system includes a menu driver for displaying data and receiving feedback from the operator. While the menu driver itself is not intended to be modified, the data specifying the contents of the menus are fully accessible. As will be described in section on the menu driver, the AIM menu driver provides a mechanism for modifying predefined menus and for adding whole new menu pages to control special devices and display special operational information. So, even though the functionality provided by the menu pages may change from one installation to the next to reflect differences in hardware configurations, the commands required to access and activate menu selections are the same in all AIM installations.

Many of the tables included in this description comprise menu pages from the AIM menu driver.

Task Level Instructions

In the present invention, the basic program instruction is called a "statement". A statement is a task-level instruction that initiates a series of motions and actions to perform an entire assembly task. For example, the most fundamental AIM/PCB statement is named "TRANSFER". TRANSFER performs a single, complete, pick-and-place task. When executed, a single TRANSFER statement will initiate the following series of actions:

1. Move the robot along an optional path to the appropriate parts feeder or series of feeders.
2. Select the feeder and acquire the part.
3. Move along an optional path to an assembly location.
4. Insert the part into its assembly location.
5. If the assembly fails, discard the part to a reject bin.
6. Move the robot clear of the assembly area along an optional path.

Each of the above actions may comprise a complex series of robot motions, low-level actions, and tests. For example, acquiring a part from a feeder can involve testing and activating several external signals, performing several robot motions to approach the feeder, grasping the part, departing from the feeder, and retrying any actions that fail.

The complete syntax for the TRANSFER statement is

```
TRANSFER {APPROACH path} PART part
    {ALONG path} TO assembly {DEPART path} {USING tool}
    {REJECT path }
``` where the braces ({ }) indicate optional clauses. The lowercase words in the statement syntax are arguments to the statement; the uppercase words are provided to enhance readability. In general, optional clauses in AIM statements can be nested within optional clauses to any required depth. For printed circuit board assembly, examples of typical TRANSFER statements would be:

TRANSFER PART sn7400 TO u20

TRANSFER PART cap.1uf ALONG transit.2 TO
    1118

```
TRANSFER APPROACH path.a5 PART
    resistor.1k

ALONG transit.3 TO 1108 USING tool.r REJECT
    path.rj
```

Notice that actual part names can be used to reference parts, and actual board position names can be used as location identifiers to that the statements are easy to read. All the data required for proper execution of the statement are extracted from the database records referenced by the argument names.

Since some installations require special tasks that are specific to the application, system customizers can modify existing statements or add new statements as required. For example, statements can be created that include special vision inspection actions, lead straightening, lead clinching, or other operations as required. After the system has been modified, the new application-specified statements can be applied in the same manner as the standard task-level statements provided with the basic system.

Within AIM, complete assembly processes are defined by grouping statements into assembly "sequences". Since a whole series of events can be initiated by a single statement, a very sophisticated process can be defined by just a short sequence of task-level statements. For example, in printed circuit board (PCB) assembly, an assembly sequence typically consists of a few dozen statements that define the entire series of component placements that a single robot cell must perform in order to assemble its portion of a printed circuit board.

Since a single cell may be used to perform several different assembly sequences, a number of assembly sequences can be maintained simultaneously within a single AIM system.

Database Overview

All of the information driving the user interface and defining assembly processes is stored in a series of formalized databases. Each database consists of an arbitrary number of "records". A record contains a group of related data. For instance, in the Part database each record contains information related to a particular part to be processed within the cell (e.g., sn7400, cap1uf, resistor.1k).

In general, records consist of patterns of variables, where the pattern can be any specified combination of byte, integer, date, real, transformation (for locations and reference frames) boolean (one byte logical value), bit flags (sixteen separately addressable bits), and string variables. Within each database, records are all the same size and follow the same pattern of variables.

There are basically two types of databases defined in the standard AIM system: runtime databases that contain information defining assembly processes, and non-runtime databases that are used to perform bookkeeping operations and operator interface functions.

The runtime databases contain information defining the assembly process. They specify the assembly steps to be performed, the algorithms to be used, and all other required data. (Note that while the discussion below refers to printed circuit board assembly systems, mechanical assembly systems would be quite similar).

Figure 4:
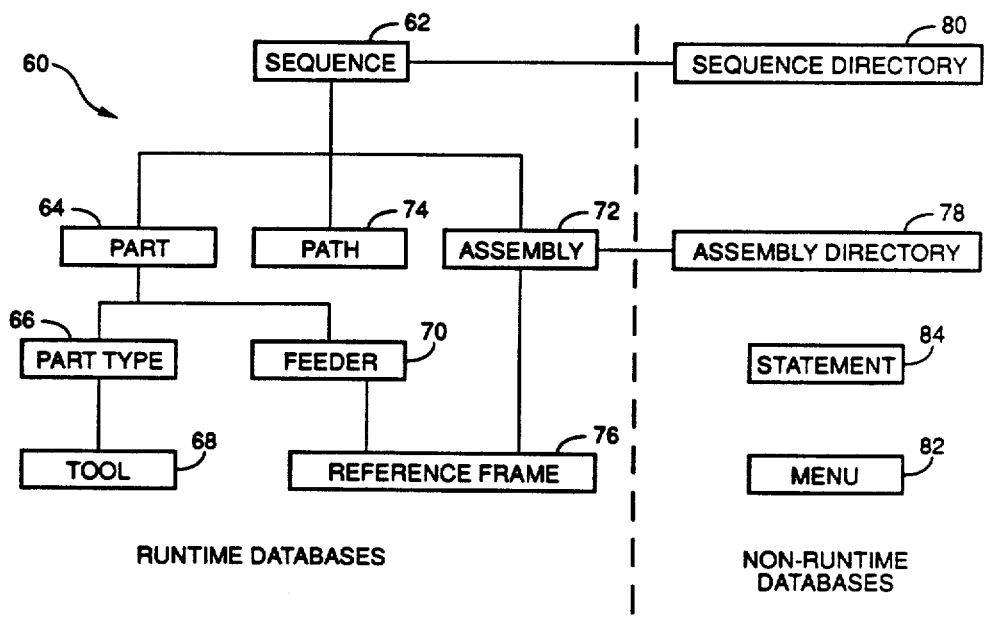
FIG. 4 is a block diagram of the databases used in the preferred embodiment to define a robotic assembly task.

FIG. 4 shows how the runtime databases 60 are related. Most steps in the Sequence database 62 include the name of a specific part and the name of an assembly location where it should be placed. Optionally, the name of one or more paths may be specified if the robot must follow a complex trajectory. A complete assembly task consists of a series of assembly steps that are performed in a prescribed sequence.

The part name in a sequence step corresponds to a record in the Part database 64, which in turn specifies a part type record in the Part Type database 66. A single part type may be referenced by many different parts since "part type" describes only the external characteristics of the part (for example, a 14-pin dip package). Among other things, the record for each part type may specify a tool 26 to be used when handling these parts by specifying a record in the Tool database 68.

The Part database record also specifies one or more feeders containing that part. Each feeder corresponds to a record in the Feeder database 70 that contains location and control parameters for that particular feeder. Together, the Part Type database 66 and the Feeder database 70 provide all the information required to acquire a specified part from the appropriate feeder.

The assembly location name corresponds to a record in the Assembly database 72 that contains location information for the current part. Together with the Part Type database 66, it provides all the information required to insert the part into the assembly.

The optional path names specify records in the Path database 74. Paths are used to avoid obstacles while performing such motions as approaching a feeder, moving from a feeder to the assembly, and departing from the assembly.

The following is a brief summary of the information contained in each of the runtime databases.

Assembly Database

The Assembly Database 72 contains the destination locations (part attachment locations) for a given assembly. Each record defines the name of a location, the value of the location, and the robot motion parameters (speed, approach height, depart height, etc.) required to move to the location. In the case of printed circuit board assembly, this database defines all of the board locations where components are to be placed. Multiple Assembly databases can be loaded in memory simultaneously.

Locations are defined by six parameters: X, Y, Z, Ry, Rp and Rr, where X, Y, and Z are orthogonal axis positions, and Ry, Rp and Rr are "oiler angles": Ry (yaw) is the angular rotation of the robot about its original Z axis, Rp (pitch) is the angular rotation about the system's Y axis after Rp is taken into account, and Rr (roll) in the angular rotation about the system's new Z axis after Ry is taken into account. As will be understood by those skilled in the art, both locations and reference frames are stored in the form of a 3×4 transform array to facilitate translations from one reference frame to another.

In the preferred embodiment, the z axis is assumed to be perpendicular to the surface of the printer circuit board 30 being assembled.

Feeder Database

Feeders are the sources for all parts. One feeder may supply several different parts or the same part may be supplied by several feeders. Each record of the Feeder database 70 defines the name, location, and operating parameters for a single feeder. The operating parameters include a list of external input/output signals required for the operation of the feeder, as well as parameters to access feeders that are pallets of parts.

Part Database

Each record in the Part database 64 defines a single part. The fields of each record define the part name, part type, and the feeder(s) containing that part.

Part Type Database

Each record in the Part Type database 66 defines a single type of part. A part type record specifies attributes that are commonly shared by a number of parts. The fields of each record defined the part type name, the functions used to acquire, insert, and reject this type of part, the speed factor to be used while holding this part, the name of the robot tool appropriate for this type of part, and parameters for the insertion function (including search parameters).

Path Database

The Path Database 74 contains the locations for all the robot motions paths. These are used to move the robot on collision-free paths between work stations. Each record contains the name of the path and up to eight locations that define the path.

Reference Frame Database

The Reference Frame database 76 contains all reference frames used by the system, including assembly and calibration reference frames. Each record contains the name and value of a single reference frame, along with any optional data that may have been used to compute the value.

Sequence Database

The Sequence database 62 contains a series of task-level statements that define the way a complete assembly operation is to be performed. Each record of the database defines a single statement. Multiple Sequence databases can be loaded in the controller memory simultaneously.

Tool Database

The Tool database 68 describes the various tools or grippers used by the robot to handle parts. Each record in this database defines a single tool be defining the name of the tool and the offset from the end of the robot to the tool grip point, for up to three different tool configurations.

The non-runtime database provide information to the operator interface or are used when performing certain bookkeeping functions.

Assembly Directory

The Assembly Directory 78 contains a list of all the Assembly databases stored on disk or in memory. Each record in this database describes a single Assembly database. The record fields define the assembly name, update information, a description, and disk file load information.

Sequence Directory

The Sequence Directory 80 contains a list of all the Sequence databases stored on disk or in memory. Each record in this database describes a single Sequence database. The record fields define the sequence name, update information, a description, disk file load information, and the name of the associated Assembly database.

Menu Database

The Menu Database 82 defines the contents and functions of all the menu pages. Each record of this database defines a single element of a menu page (for example, a menu selection, or a value to display). Multiple records are grouped by page name to generate each menu page.

Statement Database

Each record in the Statement database 84 defines the format (syntax) for a single task-level statement. This definition is used to parse statements that are input to the system. The fields in a record define the statement name, the number and types of arguments, token strings, and any optional clauses in the statement.

Detailed Description of Databases

Headers

Each database file contains a header area which is used to store data common to the entire file, the database title, including the data of the last update and the frame of reference, if any, associated with the database. Database titles are used to construct output messages to the operator and to reference databases during database editing. For example, when the SAVE key on keyboard 46 is pressed, the title from each of the open databases is extracted and displayed along with the database modification status. During database editing, when the RETRVE key is pressed and the cursor is positioned on a field which contains the name of a record in another database, the first part of the field name is compared to the loaded database titles to determine the next database to access.

Field Attribute Bits

Each record field definition has a 16-bit attribute word associated with it. The value of this word is set during database definition, and is used to indicate attributes of the field in addition to the normal database value type. The field attributes word is labeled "Attr #" in the database record definitions below.

Table 1 summarizes the field attribute bits and their interpretations.

TABLE 1

| Field Attribute Bit Definitions | |
| --- | --- |
| Mask Value | Interpretation |
| 1 | Location without approach and depart |
| 4 | Depart parameter |
| 6 | Approach parameter |
| 7 | Location with approach and depart |
| 8 | Field is optional at run time |
| 16 | Field is edited if defined during training |
| 32 | Field is for remote robot |
| 57344 | 3-Bit mask for user-defined attributes |

The low-order 3 bits (bits #1, #2 and #3) of the field attribute are used only for fields associated with locations and certain motions. Table 2 describes the only valid settings (i.e., values) for these three bits.

TABLE 2

| Definition of Field Attribute Bits 1-3 | |
| --- | --- |
| Value | Description |
| 0 | Used for all fields except locations to which the robot actually moves or special motion parameter fields described below. |
| 1 | The field is a location to which the robot moves and is not part of an approach/move/depart sequence. |
| 4 | The field is the depart motion parameter associated with the previous location. It is part of an approach/move/depart sequence. |
| 6 | The field is the approach motion parameter associated with the previous location. It is part of an approach/move/depart sequence. |
| 7 | The field is a location to which the robot moves and is part of an approach/move/depart sequence. |

Attribute value bit #4 (with mask value 8) indicates whether or not a location field is optional at run time. If this bit is set, and the runtime system detects that there is no data defined for this field, then no error will be displayed and the associated robot motion will be skipped.

Attribute value bit #5 (with mask value 16) indicates whether or not a field can be editied during walk through training. In that mode, the system will pause for editing if this bit is set, even if the field already contains valid data. To avoid flooding the operator with edit requests, this bit is normally set only for locations to which the robot moves.

Attribute value bit #6 (with mask value 32) indicates whether or not a field should be considered by the local robot in a two-robot system. If the bit is set, the field contains data for the remote robot. For most purposes, the two-robot aspect of the preferred embodiment is not relevant to the present invention and will not be described.

Attribute value bits #14, #15 and #16 (with mask values 8192, 16384 and 32768, respectively, totaling 57344) indicate that the field has special user-defined attributes which are handled by the custom routine named "pe.user.pendant".

Motion Parameters

Each location to which the robot actually moves is accompanied by standard motion parameters which further describe the motion. These parameters, listed in Table 3, must immediately follow the location field in any database record.

Table 3 lists eight parameters. The first two parameters, motion type and speed, are provided with all locations. The next four parameters are used only if the location is part of an approach/move/depart sequence. Finally, the last two parameters are used only if the location is specified with respect to a local frame of reference.

An approach/move/depart sequence is a sequence of related robot moves for approaching, moving to, and then departing from a specified location. Many locations, especially locations at which an object is to be acquired or deposited (e.g., inserted), must be approached from a certain position and at a specified, reduced speed, and must also be left at a specified angle and speed.

In the present invention, certain sets of locations are assumed to always be part of an aproach/move/depart sequence—and thus each such location and its associated sequence is defined using a standarized set of motion parameters.

The primary purpose of the motion parameters is to specify how precisely the robot must move. When there are no obstacles which might be hit and exact positioning is not important, the robot can be allowed to round off corners and to move through positions without stopping and without precisely hitting each specified location. On the other hand, where tolerances are tight, the robot can be instructed, through the use of the motion type bits, to move in a straight line, to break its motion (i.e., stop) at each point, and to keeps its position within a predefined distance of its specified path.

If the robot's motion is specified as straight line, the robot will move from specified point to specified point in a series of straight line moves. Otherwise the robot process will round off corners and follow a smooth curving trajectory.

Locations can also be defined with respect to either a global, local or dynamic reference frame. Global reference frames are reference frames used for an entire database. For instance, for each assembly database there is a global reference frame. A local reference frame can be defined for certain locations, such as the location of a feeder. Dynamic reference frames are frames in which the position of each assembly position is computed during the assembly process. For example, assembly positions can be determined using a vision system if a vision module is added to the system.

TABLE 3

| Motion Parameter Definitions | |
|---|---|
| motion type bits | These bits determine the motion interpolation method, when the motion should break, the nulling tolerance, and if the motion is relative to a reference frame. See Table 4 for the bit values. |
| motion speed | The speed factor used when either: (1) moving to the approach location in an approach/move/depart sequence, or (2) moving to the location for a simple move. |
| approach height | The approach height in millimeters in an approach/move/depart sequence. |
| approach speed | The speed factor used when moving from the approach to the location in an approach/move/depart sequence. |
| depart height | The depart height in millimeters in an approach/move/depart sequence. |
| depart speed | The speed factor used when moving from the location to the depart in an approach/move/depart sequence. |
| frame link | If the location is relative to a local frame, this field must contain the number of the record corresponding to the frame name below. (This value is normally filled in by the database linker routine and is not visible to the operator.) |
| frame name | If the location is relative to a local frame this field must contain the name of the reference frame to use. |

TABLE 4

| Motion Type Bit Definitions | |
|---|---|
| Mask Value | Interpretation |
| 1 | Set if straight-line motion |
| 2 | Set if break at location |
| 4 | Set if break at approach location |
| 8 | Set if break at depart location |
| H10 | Set if fine tolerance at location |
| H20 | Set if relative to global db frame |
| H40 | Set if relative to dynamic frame |
| H80 | Set if relative to local frame |
| HE0 | Mask for previous 3 relative bits |
| H2000 | Set if path entry point - used only for path locations |
| H4000 | Set if path exit point - used only for path locations |

Pendant Teaching

The operator interface includes a database editor. When using the database editor, location values can be "taught" (i.e., entered) by manually moving the robot (using a manual control pendant such as the one used on the ADEPT model 840 robot). This is done by pressing the TEACH key on the system's terminal with the display's cursor on an appropriate field.

The type of data to be taught is indicated by the user field attributes (see Table 1) associated with that field in the database. Thus, if the cursor is placed on an approach or depart field, this will be indicated by the field attributes, and the user will be promted to enter values for the motion parameters shown in Table 2.

If any of the user-controlled attribute bits are set (see Table 1), pressing the TEACH key causes, the user of the system must provide a custom routine "pe.user.pendant" to be called instead of the normal pendant teaching routines, described below, to write new values into the appropriate fields.

Linking

As noted in the database descriptions below, the databases in the runtime system are interrelated. More specifically, records in some databases refer to records in other databases. Each such reference is generally made by specifying the name of a record in the related database.

When an assembly is selected for execution, the operator task links all the related databases for the assembly by storing in the field following each database reference the record number of the referenced item. The purpose of the linking process is to make execution of the assembly more efficient by providing database record pointers for use by the runtime programs, and to determine if any of the referenced items are not found (in which case the link program will generate an error code).

Assembly Database

An "assembly" is a set of destination locations for all the parts being assembled. The data describing each assembly is found in a separate Assembly database file. The files for Assembly databases are named with the form "ASMn.DB" where "n" is a number automatically assigned when a new assembly is defined.

Each record in an Assembly database defines a location where a part is to be placed, and how. The record fields, which are listed in Table 5 in the order in which they occur within each record, define the name of the location and the robot motion parameters used while moving to the location. Table 6 summarizes the purpose of each field. The database editor presents the data in each assembly record using the format shown in Table 7.

TABLE 5

Record Definition for the Assembly Database

| # | Field Name | Data Type | Size | Attr # |
|---|---|---|---|---|
| 0 | name | string | 15 | |
| 1 | update date | date | 4 | |
| 2 | location | transform | 48 | 32 + 16 + 7 |
| 3 | location type bits | binary | 2 | 32 |
| 4 | speed | integer | 2 | 32 |
| 5 | approach | integer | 2 | 32 + 6 |
| 6 | approach speed | integer | 2 | 32 |
| 7 | depart | integer | 2 | 32 + 4 |
| 8 | depart speed | integer | 2 | 32 |
| 9 | user parameter 1 | real | 4 | 32 + 16 |
| 10 | user parameter 2 | real | 4 | 32 + 16 |

TABLE 6

Field Definitions for the Assembly Database

| name | This name is referenced in a statement to specify the destination of a part. |
|---|---|
| update date | The date when this record was last modified. |
| location | The location of the tool when the part is inserted into the assembly. |
| location type | |
| speed | |
| approach | |
| approach speed | |

TABLE 6-continued

Field Definitions for the Assembly Database

| depart | |
|---|---|
| depart speed | Standard robot motion parameters which determine how to approach and depart from the assembly location. See Table 3, and the accompanying text above for a description of motion parameters. |
| user parameter 1 and 2 | Real values which are available for general use by the system customizer. |

TABLE 7

Assembly Location Menu

```
                                        Updated: _____
              ASSEMBLY LOCATION Name: _____
Location: _____
Speed: ___ Straight: ___ Relative: ___ Computed: ___ Fine tol: ___
Height/Break/Speed    APPROACH: __/__/__    DEPART: __/__/__
User Parameters:   1: ___    2: ___
```

Assembly Directory Database

This database is a directory of all the Assembly databases currently in existence in the system. Each record in the Assembly Directory database describes a single Assembly database which is known to the system. The fields define the assembly name, date information, a description, the disk file, auto-load information, and the names of the reference frames for the assembly.

Table 8 lists the record fields, in the order in which they occur within a record. The fields are summarized in Table 9. The database editor presents these records using the format shown in Table 10.

TABLE 8

Record Definition for the Assembly Directory Database

| # | Field Name | Data Type | Size | Array | Attr # |
|---|---|---|---|---|---|
| 0 | assembly name | string | 15 | | |
| 1 | update date | date | 4 | | |
| 2 | creation date | date | 4 | | |
| 3 | description | string | 72 | | |
| 4 | disk file | string | 13 | | |
| 5 | auto load | boolean | 1 | | |
| 6 | reference frame name | string | 15 | 2 | |

TABLE 9

Field Definitions for the Assembly Directory Database

| assembly name | A name which uniquely identifies an assembly. This name is referenced by the scheduler program when selecting an assembly. |
|---|---|
| update date | The date when this record was last modified. This field is automatically set to the current date when the record is edited. |
| creation date | The date when the assembly named above was first created. |
| description | A one line description of the assembly, which serves only as a comment. |
| disk file | The name of the disk file which contains the actual Assembly database. This name has the format "ASMn.DB" where "n" is a number automatically assigned by the system when the assembly sequence is created. |
| auto load | A flag which, if TRUE, indicates that this assembly should automatically be loaded from disk to memory when AIM starts up. If FALSE, then the operator or scheduler must explicitly load this assembly before it can be accessed. |

TABLE 9-continued

Field Definitions for the Assembly Directory Database

| | |
|---|---|
| ref frame name | An array of names which specify the reference frames to be used for this assembly. The second array element is used only in two-robot systems. No reference frame is used this field is blank. See the description of the Reference Frame database for more details. |

TABLE 10

Assembly Directory Menu

```
Created: _____          Updated: _____

ASSEMBLY DIRECTORY

Assembly name: _____   Disk file: _____

Description:
_____

Name of assembly's primary frame: _____

Name of assembly's secondary frame: _____

Automatically load assembly when system started: ____
```

Feeder Database

Feeders are the sources of all parts. A feeder can supply multiple parts and the same part can be supplied by multiple feeders.

Each record in the Feeder database defines a single feeder. The fields in a feeder record define the location of the feeder, and the parameters required to operate the feeder.

Table 11 lists the fields in each feeder record, Table 12 summarizes the interpretation of each field, and Table 13 shows the format in which feeder records are presented by the database editor.

TABLE 11

Record Definition for the Feeder Database

| # | Field Name | Data Type | Size | Array | Attr # |
|---|---|---|---|---|---|
| 0 | name | string | 15 | | |
| 1 | update date | date | 4 | | |
| 2 | device | integer | 2 | | |
| 3 | [internal flags] | binary | 2 | | |
| 4 | feeder type name | string | 15 | | |
| 5 | location | transform | 48 | | 16 + 7 |
| 6 | location type bits | binary | 2 | | |
| 7 | speed | integer | 2 | | |
| 8 | approach | integer | 2 | | 6 |
| 9 | approach speed | integer | 2 | | |
| 10 | depart | integer | 2 | | 4 |
| 11 | depart speed | integer | 2 | | |
| 12 | [frame] | integer | 2 | | |
| 13 | frame name | string | 15 | | |
| 14 | transit | transform | 48 | | 16 + 8 + 1 |
| 15 | transit type bits | binary | 2 | | |
| 16 | transit speed | integer | 2 | | |
| 17 | enable signal | integer | 2 | | |
| 18 | ready signal | integer | 2 | | |
| 19 | feed part signal | integer | 2 | | |
| 20 | empty alarm signal | integer | 2 | | |
| 21 | clamp signal | integer | 2 | | |
| 22 | feed next part signal | integer | 2 | | |
| 23 | retry count | integer | 2 | | |
| 24 | maximum time | integer | 2 | | |
| 25 | cycle time | real | 4 | | |
| 26 | pallet type | integer | 2 | | |
| 27 | pallet row count | integer | 2 | | |
| 28 | pallet col count | integer | 2 | | |
| 29 | pallet row index | integer | 2 | | |
| 30 | pallet col index | integer | 2 | | |
| 31 | pallet row spacing | real | 4 | | |
| 32 | pallet col spacing | real | 4 | | |
| 33 | user parameter 1 | real | 4 | | |
| 34 | user parameter 2 | real | 4 | | |
| 35 | user parameter 3 | real | 4 | | |
| 36 | user parameter 4 | real | 4 | | |
| 37 | user parameter 5 | real | 4 | | |
| 38 | user parameter 6 | real | 4 | | |
| 39 | lead name | string | 15 | | |
| 40 | [lead] | integer | 2 | | |

TABLE 12

Field Definitions for the Feeder Database

| | |
|---|---|
| name | A name which uniquely identifies this feeder. This name is used by the linker to link part records to their associated feeder records. This name is also displayed to the operator during training or when reporting errors. |
| update date | The date when this record was last modified. |
| device | The number of the system device associated with this record. This field is ignored by systems with only one robot. |
| [internal flags] | Flag values used internally by the runtime system. |
| feeder type name | The name of the type of this feeder. This is the name of the menu page to be accessed when the feeder control panel for this feeder is to be displayed. |
| location | The location of the robot tool when the part is gripped. |
| location type bits speed approach approach speed depart depart speed [frame] | |
| frame name | Standard robot motion parameters which determine how to approach and depart from the part grip location. See the "Motion Parameters" description, above. |
| transit | Optional location which determines a location through which the robot tool tip will move on the way to and from the feeder. If not defined, this field is ignored and no intermediate transit motion occurs. |
| transit type transit speed | Standard robot motion parameters which determine how to move toward the transit location. These fields |

TABLE 12-continued

Field Definitions for the Feeder Database

| | |
|---|---|
| | are ignored if no transit location is defined (see above). |
| enable signal | The numerical identifier of a software signal which determines whether or not this feeder is enabled for operation. If the signal is FALSE, indicating not enabled, the system will not attempt to acquire a part from this feeder. If the signal number is zero, the system assumes the feeder is not enabled. |
| ready signal | The numerical identifier of a software signal or binary input signal which specifies that this feeder has a part ready to be acquired. If the signal number is negative, the logic of the signal is inverted. If the signal number is zero, the system assumes that the feeder is always ready. |
| feed part signal | The number of a binary output signal which will be asserted to cause a part to be presented for gripping. If the number is negative, the logic of the signal is inverted. If the number is zero, the system does not assert any output signal. |
| empty alarm signal | The number of a binary output signal which will be asserted to activate an alarm when a feeder becomes empty or a feed error occurs. If the number is negative, the logic of the signal is inverted. If the number is zero, the system does not assert any output signal. |
| clamp signal | The number of a binary output signal which will be asserted to activate a part clamp at the feeder. If the number is negative, the logic of the signal is inverted. If the number is zero, the system does not assert any output signal. |
| feed next part signal | The number of a binary output signal which can be asserted to cause a part to feed after removing a part from a feeder. Not currently used by the system software, but available for system customizers. |
| retry count | The maximum number of times the system should try to acquire a part from the feeder before giving up and signaling an error. No retries are attempted if the value is zero. |
| maximum time | The maximum number of seconds the system should wait for a feeder to become ready before signaling an error. This value should be greater than the cycle time (described below) or errors may be signaled during normal operation. |
| cycle time | The time (in seconds) required for a feeder to become ready after it has fed a part. The system will wait for at least this long before attempting to access a feeder after a part has been extracted, even if the part-ready signal indicates a part is ready. |
| pallet type | A type code used by the "rn.ac.pallet" routine to determine the order in which parts should be removed from a pallet. |
| pallet row count pallet col count | The number of rows and columns on a pallet. |
| pallet row index pallet col index | The row and column index for the next part to be accessed from a pallet. The first part to be accessed is in row 1, column 1. |
| pallet row spacing pallet col spacing | The spacing between pallet rows and columns, respectively. |
| user parameter n | A group of six fields which are available for general use. The first two fields are used by the standard acquire strategy routines as tool coordinate X and Y offsets. |
| lead name | The name of a Lead database record associated with this feeder. This name is required only if special hardware like a clincher is included in the system. |
| [lead] | The number of the record in the Lead database which corresponds to the lead name. This value is automatically filled in by the linker. |

TABLE 14
Standard Feeder Record Form

```
                                                    Updated: _____

PARTS FEEDER          Robot: _____

Name: _____      Lead: _____     Type: _____
Transmit: _____
Speed: ___ Straight: ___ Relative: ___ Computed: ___ Break: ___

Location: _____
Speed: ___ Straight: ___ Relative: ___ Indexed: ___ Fine tol: ___
Height/Break/Speed    APPROACH: __/__/__    DEPART: __/__/__
Frame: _____

Binary Signals
Enabled: _____    Empty alarm: _____    Retry count:  _____
Part ready: _____ Clamp: _____          Maximum time: _____
Feed part: _____  Feed next: _____      Cycle time:   _____

Pallet Parameters                User Parameters
Type: __  Spacing  Count   Index        1: _____  4: _____
Row:      _____    _____   _____        2: _____  5: _____
Column:   _____    _____   _____        3: _____  6: _____
```

Part Database

Each record in this database defines a single part. The fields in a record define the part name, type, and feeders for the part. Internal fields in the Part database are filled in during linking.

A single part can have multiple feeders. Normally a feeder feeds only a single part. For feeders which feed different parts, the same feeder can be referenced by multiple Part database records. When using this feature, it is the responsibility of the system customizer to keep track of what part will be fed next.

All the record fields are listed in Table 15, in the order in which they occur within a record. The fields are summarized in Table 16. The database editor presents data using the format shown in Table 17.

TABLE 15
Record Definition for the Part Database

| # | Field Name | Data Type | Size | Array | Attr # |
|---|---|---|---|---|---|
| 0 | name | string | 15 | | |
| 1 | update date | date | 4 | | |
| 2 | part type name | string | 15 | | |
| 3 | [part type] | integer | 2 | | |
| 4 | [internal flags] | binary | 2 | | |
| 5 | feeder name | string | 15 | 4 | |
| 6 | [feeder] | integer | 2 | 4 | |

TABLE 16
Field Definitions for the Part Database

| | |
|---|---|
| name | A name which uniquely identifies this part. This name is referenced in assembly sequence statements. |
| update date | The date when this record was last modified. |
| part type name | A standard name which specifies the type of this part. This name must be present in the Part Type database. |
| [part type] | The number of the record in the Part Type database which corresponds to the part type name. This value is automatically computed by the linker. |
| [internal flags] | Flag values used internally by the runtime system. |
| feeder name | An array of names which specify feeders for this part. The names must be present in the Feeder database. |
| [feeder] | The numbers of the records in the Feeder database which correspond to the feeder names. The acquire routine uses these values when searching for a feeder. These values are computed during linking. |

TABLE 17
Standard Part Record Form

```
                                         Updated: _____

PART

Name: _____        Part type: _____

Feeders:
  1: _____        3: _____
  2: _____        4: _____
```

Part Type Database

Each record in this database defines a single type of part. A part type record specifies attributes (generally the physical attributes relevant to the assembly sequence) which are commonly shared among multiple parts.

The fields in a record define the part type name, the names of routines used to acquire, insert, and reject this type of part, the speed factor to be used while holding this part, the name of the robot tool appropriate for this type of part, and parameters for the insertion routine.

The record fields for the part type database are listed in Table 18, in the order in which they occur within a record. The fields are summarized in Table 19. The database editor presents data using the format shown in Table 20.

TABLE 18
Record Definition for the Part Type Database

| # | Field Name | Data Type | Size | Array | Attr # |
|---|---|---|---|---|---|
| 0 | name | string | 15 | | |
| 1 | update date | date | 4 | | |
| 2 | acquire routine | string | 15 | | |
| 3 | insert routine | string | 15 | | |
| 4 | reject routine | string | 15 | | |
| 5 | speed when holding part | integer | 2 | | |
| 6 | tool name | string | 15 | | |
| 7 | [tool] | integer | 2 | | |
| 8 | lead name | string | 15 | | |
| 9 | [lead] | integer | 2 | | |
| 10 | search step size along X | real | 4 | | |
| 11 | maximum search along X | real | 4 | | |
| 12 | search step size along Y | real | 4 | | |
| 13 | maximum search along Y | real | 4 | | |
| 14 | search step size about Z | real | 4 | | |
| 15 | maximum search about Z | real | 4 | | |
| 16 | depart distance during search | real | 4 | | |

TABLE 19
Field Definitions for the Part Type Database

| | |
|---|---|
| name | A name which uniquely identifies this part type. This name is referenced in the Part database. |
| update date | The date when this record was last modified. |
| acquire routine | Specifies the name of a subroutine which is called to acquire parts of this type from their feeders. For details see the discussion of the part acquisition routine below. |
| insert routine | Specifies the name of a routine which is called to insert a part of this type into an assembly. For details see the discussion of the part insertion routine below. |
| reject routine | Specifies the name of a routine which is called to reject a part of this type. For details see the discussion of the part reject routine below. |
| speed when holding part | The robot speed factor to be used when holding the part in the gripper, expressed as a percentage. This factor is multiplied by the motion speed specified when moving to an approach location or traversing a path. |
| tool name | Specifies the tool to be used when handling parts of this type. This name identifies the record in the Tool database which contains data defining the tool. This name must be present in the Tool database. See the description of the Tool database, below, for more details. |
| [tool] | The number of the record in the Tool database which describes the tool to be used for this part. |
| search size along X<br>maximum search along X<br>search size along Y<br>maximum search along Y<br>search size about Z<br>maximum search about Z<br>depart distance during search | These data fields define parameters which can be used by an insertion strategy routine. See the discussion of part insertion strategy routines below. |

TABLE 20
Standard Part Type Record Form

```
                                           Updated: _____

PART TYPE

Name: _____                    Acquire routine: _____
Tool: _____                    Insert routine:  _____
Speed when holding part: ___   Reject routine:  _____

Insertion search parameters:
                           Step size    Maximum excursion
      Along X:              ___ mm         ___ mm
      Along Y:              ___ mm         ___ mm
      Along Z:              ___ deg        ___ deg
      DEPART height:        ___ mm
```

Path Database

Each record in this database defines a single robot motion path consisting of up to eight locations. The fields in a record define the path name and an array of locations which determine the path. Each location in the array has associated with it a motion type word and a speed factor. This permits each segment of a path to have different motion parameters.

Path locations are also flagged as path entry or exit locations as appropriate. A path can be entered only at one of its entry points, and the path can be exited only at one of its exit points. An example of a path with multiple exit points is a path for moving to one of several feeders, with one exit point above each feeder.

The record fields for the Path database are listed in Table 21, in the order in which they occur within a record. The fields are summarized in Table 22. The database editor presents data using the format shown in Table 23.

TABLE 21

Record Definition for the Path Database

| # | Field Name | Data Type | Size | Array | Attr # |
|---|---|---|---|---|---|
| 0 | name | string | 15 | | |
| 1 | update date | date | 4 | | |
| 2 | device | integer | 2 | | |
| 3 | location | transform | 48 | 8 | 16 + 1 |
| 4 | location type bits | binary | 2 | 8 | |
| 5 | speed | integer | 2 | 8 | |

TABLE 22

Field Definitions for the Path Database

| | |
|---|---|
| name | A name which uniquely identifies this path. This name is referenced in assembly sequence statements. |
| update date | The date when this record was last modified. |
| device | The number of the robot associated with this record. This field is ignored by systems with only one robot. |
| location | An array of locations which determine the path. Paths start at the first entry location in the array and end at an appropriate exit location. |
| location type bits | An array of motion type bits which corresponds to the location array. Each type-bit word determines the interpolation mode and transition type for the corresponding location. These type bits are similar to the type bits in a standard motion parameter array. In addition, two special flag bits, shown at the end of Table 4 indicate whether a location is a valid entry point or exit point. |
| speed | An array of motion speed factors which corresponds to the array of locations. These values determine the robot speeds for moving along the path segments. |

TABLE 23

Standard Path Record Form

```
                                          Updated: _____

PATH DESCRIPTIONS

Name: _____                          Robot: ____

Straight  Entry
  Path Transmit Locations   Speed | Break |  Exit
                                  |   |   |   |
1. _____  ___   __  __  __  __
2. _____  ___   __  __  __  __
3. _____  ___   __  __  __  __
4. _____  ___   __  __  __  __
5. _____  ___   __  __  __  __
6. _____  ___   __  __  __  __
7. _____  ___   __  __  __  __
8. _____  ___   __  __  __  __
```

Reference Frame Database

The Reference Frame database describes frames of reference which are used by the system. Each record in this database defines a single reference frame. The fields in a record define the actual frame transformation value, as well as optional data from which a reference frame can be computed.

The record fields for the Reference Frame database are shown in Table 24, in the order in which they occur within a record. The fields are summarized in Table 25. The database editor presents data using the format shown in Table 26.

TABLE 24

Record Definition for the Reference Frame Database

| # | Field Name | Data Type | Size | Array | Attr # |
|---|---|---|---|---|---|
| 0 | name | string | 15 | | |
| 1 | update date | date | 4 | | |
| 2 | device | integer | 2 | | |
| 3 | description | string | 72 | | |
| 4 | frame center | transform | 48 | | |
| 5 | frame X axis | transform | 48 | | |
| 6 | frame Y axis | transform | 48 | | |
| 7 | frame value | transform | 48 | | |

TABLE 25

Field Definitions for the Reference Frame Database

| | |
|---|---|
| name | A name which uniquely identifies this frame. |
| update date | The date when this record was last modified. |
| device | Used only in multi-robot systems to identify the device (i.e., robot) associated with this record. |
| description | A comment field which contains a single-line description of the frame. |
| frame center | An optional value which defines the origin of the frame transformation. |
| frame X axis | An optional value which defines the direction of the frame X axis with respect to the frame origin. That is, the frame X axis is assumed to pass through the origin and the point defined by this transformation, and be directed from the origin toward this point. |
| frame Y axis | An optional value which defines the direction of the frame Y axis with respect to the frame X axis. That is, the frame Y axis is assumed to be parallel to a line through the point defined by this transformation and perpendicular to the frame X axis. (Note that the point defined by this transformation may not lie on the frame Y axis.) |
| frame value | The actual reference frame value used when the system is running, computed from the other values in this record, or defined during a setup procedure. |

TABLE 26

Standard Reference Frame Record Form

```
                                          Updated: _____

REFERENCE FRAME

Name: _____                          Robot: ____
Description: _____

_____
Frame value: _____

Frame center point: _____

Point on frame positive X axis:

_____

Point near frame positive Y axis:

_____
```

Sequence Database

Each record in a Sequence database comprises one task statement. The series of statements defined by these records is an assembly sequence. A typical installation will contain multiple Sequence databases, each one describing a separate assembly sequence. The files which contain the assembly sequences are named with the form "SEQn.DB" where "n" is a number automatically assigned when a new sequence is defined.

Typically, there is no need for a user or system customizer to directly examine the records of a Sequence database. The preferred embodiment provides a sequence editor which provides a much more convenient method of viewing and altering this data. In particular, the records are displayed as a series of statements, such as TRANSFER PART sn7400 TO u20

TRANSFER PART cap.1uf ALONG transit.2 TO 1118

TRANSFER APPROACH path.a5 PART resistor.1k

ALONG transit.3 TO 1108 USING tool.r REJECT path.rj

When a new statement is to be entered, or an existing statement is to be modified, the user can press an EXPAND key on the terminal to see the full syntax of the statement being entered, such as:
TRANSFER {APPROACH path} PART part {ALONG path}

TO assembly {DEPART path} {USING tool} {REJECT path} where the braces ({}) indicate optional clauses.

Each parameter can be entered directly, or by placing the display's cursor under the item and then using the RETRIEVE key on the terminal to see a menu of items from the corresponding database. Thus a path can be selected from a menu of the path records in the Path database, and a part can be selected from a menu of the part records in the Part database.

The record fields for the Sequence database are listed in Table 27, in the order in which they occur within a record. The fields are summarized in Table 28. The database editor presents data using the format shown in Table 29.

TABLE 27

Record Definition for the Sequence Database

| # | Field Name | Data Type | Size | Array | Attr # |
|---|---|---|---|---|---|
| 0 | flags | binary | 2 | | |
| 1 | update date | date | 4 | | |
| 2 | line count | byte | 1 | | |
| 3 | argument count | integer | 2 | | |
| 4 | argument string | string | 15 | 12 | |
| 5 | [argument ptr] | integer | 2 | 12 | |

TABLE 28

Field Definitions for the Sequence Database

| | |
|---|---|
| flags | Not used. |
| update date | The date when this record was last modified. |
| line count | This field is reserved for use by the sequence editor. The editor stores in this field the number of lines required to display the statement on the terminal. |
| argument count | The number of arguments in this sequence record. That is, the number of arguments defined for this sequence statement. |
| argument string | The elements of this field contain the argument strings for the sequence statement. Tokens strings are not included. The first string is always the name of the statement. Subsequent strings define the statement arguments. (Note: The arguments defined in this field must correctly match the statement syntax, as defined in the Statement database.) |
| [argument ptr] | For each of the elements of the "argument string" field, there is an element in this array field. The value of each "[argument ptr]" element is the record number in the appropriate database for the corresponding argument in the "argument string" field. The values of these pointers are computed just prior |

TABLE 28-continued

Field Definitions for the Sequence Database to execution of the sequence. The linking permits the runtime routines to quickly access the database records for each argument of a statement.

TABLE 29

Standard Sequence Record Form

```
                                           Updated: _____
              ASSEMBLY SEQUENCE Argument Count: ____              Line count: ____
      Argument Strings              [argptrs]
  1. _____                _____
  2. _____                _____
  3. _____                _____
  4. _____                _____
  5. _____                _____
  6. _____                _____
  7. _____                _____
  8. _____                _____
  9. _____                _____
 10. _____                _____
 11. _____                _____
 12. _____                _____
```

Sequence Directory Database

A directory of all Sequence databases is maintained by the system. Each record in a Sequence Directory database describes a single Sequence database which is known to the system. The fields define the sequence name, date information, a description of the sequence, the disk file for the database, auto-load information, and the name of the associated Assembly database.

The record fields for the Sequence Directory database are listed in Table 30, in the order in which they occur within a record. The fields are summarized in Table 31. The database editor presents data using the format shown in Table 32.

TABLE 30

Record Definition for the Sequence Directory Database

| # | Field Name | Data Type | Size | Array | Attr # |
|---|---|---|---|---|---|
| 0 | sequence name | string | 15 | | |
| 1 | update date | date | 4 | | |
| 2 | creation date | date | 4 | | |
| 3 | description | string | 72 | | |
| 4 | disk file | string | 13 | | |
| 5 | auto load | boolean | 1 | | |
| 6 | assembly name | string | 15 | | |

TABLE 31

Field Definitions for the Sequence Directory Database

| | |
|---|---|
| sequence name | Identifies a sequence. This name is referenced by the scheduler program when selecting a sequence. |
| update date | The date when this record was last modified. |
| creation date | The date when the sequence was first created. |
| description | A one-line description of the sequence, which serves only as a comment. |
| disk file | The name of a disk file which contains the actual Sequence data base. This name has the format "SEQn.DB" where "n" is a number automatically assigned when the sequence is created. |
| auto load | A flag which, if TRUE, indicates that this sequence should automatically be loaded from disk to memory when the system starts up. If the flag is FALSE, the operator or scheduler program must |

TABLE 31-continued

Field Definitions for the Sequence Directory Database

| | |
|---|---|
| | explicitly load this sequence before it can be accessed. |
| assembly name | Specifies the Assembly database from which the part destination locations are extracted. Each sequence must have an associated assembly, but multiple sequences can reference the same assembly. |

TABLE 32

Standard Sequence Directory Record Form

```
                                        Updated: _____
              SEQUENCE DIRECTORY
Sequence name: _____     Disk file: _____
Description:
_____

Name of associated Assembly database: _____
Automatically load sequence when system started: ____
```

Statement Database

Each record in this database defines the syntax of a single statement—and thus acts as a template. This definition is used by the statement editor to parse statements which are entered by the operator. The fields in a record define the statement name, the number and types of arguments, token strings, and any optional clauses in the statement.

The record fields for the Statement database are listed in Table 33, in the order in which they occur within a record. The fields are summarized in Table 34. The database editor presents data using the format shown in Table 35, and Table 36 shows the statement record for the TRANSFER statement used in the preferred embodiment.

TABLE 33

Record Definition for the Statement Database

| # | Field Name | Data Type | Size | Array | Attr # |
|---|---|---|---|---|---|
| 0 | name | string | 15 | | |
| 1 | update date | date | 4 | | |
| 2 | creation date | date | 4 | | |
| 3 | argument count | integer | 2 | | |
| 4 | argument type | integer | 2 | 12 | |
| 5 | token string | string | 15 | 12 | |
| 6 | clause start | byte | 1 | 12 | |
| 7 | clause end | byte | 1 | 12 | |

TABLE 34

Field Definitions for the Statement Database

| | |
|---|---|
| name | This field contains the name of the statement. This is the actual string that will be seen with the sequence editor when the statement is used in an assembly sequence. This name also defines the statement routine which defines the operations associated with this statement. |
| update date | The date when this record was last modified. |
| creation date | The date when the sequence was first created. |
| argument count | The number of real arguments contained in the statement syntax. |
| argument type | This field defines the type of argument for each of the arguments of the statement. The elements of this field are arranged in the order in which the arguments appear in the argument list for the statement. The argument type is a number which usually specifies the database associated with the argument. For example, if an argument is a "path", this field would contain the internal database number for the Path database. However, the field value must be −1 if the statement argument is a constant. |
| token string | This field contains the strings associated with token arguments of the statement. There is a one-to-one correspondence between the elements of this field and the elements of the "argument type" field. Each statement argument has a token string associated with it (even if the string is left blank). Token strings are used to make the statement more readable when it is displayed by the sequence editor. The text contained in this string is the actual text that will appear for the token when the statement is displayed by the sequence editor. |
| clause start clause end | Each statement argument can begin and/or end one or more optional clauses. The "clause start" field indicates how many optional clauses start with the current token string and argument pair. The "clause end" field indicates how may optional clauses end with the current pair. Proper setting of these values allows for different types of nested clauses. If "{" and "}" are used to denote the nesting of clauses in a syntax definition, then "clause start" indicates the number of {'s which precede the token string and argument pair and "clause end" indicates the number of }'s which follow the pair. |

TABLE 35

Standard Sequence Record Form

```
Created: _____              Updated: _____

STATEMENT DATABASE

Statement name: _____        Argument Count: ____

Arg
          "{"    Token string      type   "}"
     1.   ___    _____       ___    ___
     2.   ___    _____       ___    ___
     3.   ___    _____       ___    ___
     4.   ___    _____       ___    ___
     5.   ___    _____       ___    ___
     6.   ___    _____       ___    ___
     7.   ___    _____       ___    ___
     8.   ___    _____       ___    ___
     9.   ___    _____       ___    ___
    10.   ___    _____       ___    ___
    11.   ___    _____       ___    ___
    12.   ___    _____       ___    ___
```

TABLE 36
Statement Record Form for TRANSFER Statement

```
Created: _____           Updated: _____

STATEMENT DATABASE

Statement name: Transfer      Argument Count: 7

Arg
      "{"   Token string      type   "}"
  1.   1    APPROACH           7      1
  2.   0    PART               5      0
  3.   1    ALONG              7      1
  4.   0    TO                10      0
  5.   1    DEPART             7      1
  6.   1    USING              8      1
  7.   1    REJECT             7      1
  8.   —    _____            —      —
  9.   —    _____            —      —
 10.   —    _____            —      —
 11.   —    _____            —      —
```

Tool Database

The Tool database describes multiple tools or grippers which are used by the robot when it handles parts. Each record in this database defines a single tool. The fields in a record define the offset from the end of the robot to the tool grip point, for up to three different tool configurations.

The record fields for the Tool database are listed in Table 37, in the order in which they occur within a record. The fields are summarized in Table 38. The database editor presents data using the format shown in Table 39.

TABLE 37
Record Definition for the Tool Database

| # | Field Name | Data Type | Size | Array | Attr # |
|---|---|---|---|---|---|
| 0 | name | string | 15 | | |
| 1 | update date | date | 4 | | |
| 2 | device | integer | 2 | | |
| 3 | tool transformation | transform | 48 | 3 | |

TABLE 38
Field Definitions for the Tool Database

| | |
|---|---|
| name | A name which uniquely identifies this tool. The tool name is referenced by the Part Type database and is used to associate a tool with a particular part. |
| update date | The date when this record was last modified. |
| device | The number of the system device associated with this record. This field is ignored by systems with only one robot. |
| tool transformation | Each element of this array defines an offset from the robot tool mounting flange to the actual part grip point. These transformations should be defined so that the positive Z axis of the tool points in the approach direction during part insertion. The multiple array elements are intended to be used with a tool which changes configuration, such as a pivoting gripper. |

TABLE 39
Standard Tool Record Form

```
                              Updated: _____
              TOOL

Name: _____         Robot: _____
Tool 1: _____
Tool 2: _____
Tool 3: _____
```

THE USER INTERFACE/MENU DRIVER

This section describes the principal features of the user interface. The interface allows the user to load, store, and edit data; control and display the stutus of devices; generate reports; and control the execution of assembly sequences.

Access to all user interface functions is gained through a series of easy-to-understand menu "pages". Each page contains information about some aspect of the system, and may permit the user to select new pages, enter data, or initiate a function. The user interface executes concurrently with the processing of assembly sequences. So, except for features that might cause an executing assembly sequence to malfunction, the menu pages and their associated functions can be accessed at any time.

User Interface Functions

The principal functions provided by the user interface are as follows:

1. Database editing. To simplify the definition of data contained in database records, AIM includes a screen oriented, forms entry database editor. The editor allows the user to display and edit individual records and can also be used to search through a database to locate records that match a given search specification.

Each database has an associated database form, as shown in the tables reference in the above description of the runtime databases. When a record is displayed, the database editor overlays the record values on top of the form. The form labels each of the displayed fields and can provide other helpful descriptive information. In addition, the form provides information to specify the ranges of allowable values for each field, which fields are mandatory, how field values should be displayed, what default values should be assigned to fields, and whether fields are read-only, write-only, or read-write.

2. Sequence editing. One of the most important features of the present invention is the introduction of task-level statements to define assembly operations. It is possible to use the database editor to edit sequences, but the preferred embodiment includes a separate screen-oriented editor to make it easier to edit task-level statements within sequences.

Like conventional full-screen text editors, the sequence editor displays a screen window of statements; allows the screen window to be moved up and down through the sequence; permits statements to be inserted, deleted, and copied; allows individual arguments to be modified; and performs search and change operations. However, unlike standard text editors, the sequence editor understands the syntax of the statements. By reading the Statement database, the sequence editor knows what type of argument is expected for each statement and which arguments are contained within optional clauses. As soon as the statement name is specified, the sequence editor prompts the user for the name of each required argument. If the user cannot remember the name of a data record, the editor can display a list of the defined data records. In fact, by pressing a single key (the RETRIEVE key on the operator's console), it is even possible to edit the value of a database record that is referenced by a statement.

For example, to create a new TRANSFER statement within a sequence, the user would first initiate editing of the desired sequence. Then he would press the INSERT LINE key to insert a new statement. At this point, he could either type in the word "TRANSFER" or press the RETRIEVE key to display the list of possible statement names. In the latter case, after using the display's cursor to point at a statement name, pressing the RETRIEVE would return to the sequence editor and fill in the selected statement name. The editor would then prompt for the first argument which, in this case, references a path record. Again, the user could either type in the path record name or press the RETRIEVE key to display the list of possible paths. If the user chooses to display the list of paths, he could then either (1) select a record name and return to the sequence editor, (2) create a new name and return, or (3) edit the field values of the selected path record and return to the sequence editor at a later time.

3. Teaching locations. One of the most time consuming tasks facing the implementer of an assembly cell is the definition of robot positions. This process often requires the user to physically place the robot at a location and then record that position for later use. To simplify the location teaching process, the system allows guided location teaching through a manual control pendant as well as allowing the user to enter locations via either the terminal or a host computer.

When pendant teaching is invoked, the pendant enables the user to move the robot to taught locations; set the state of selected external input/output signals; and teach approach, depart, and destination locations.

4. Virtual control panels. For hardware supported by the AIM/PCB system, menu pages are provided to display the status of the devices and to control them. The values displayed by these menu pages are automatically updated (if the corresponding menu record flag is set) by the system every few seconds to ensure that they accurately reflect the state of the hardware. For example, Table 45 shows a virtual control page for a feeder which shows the current status of the feeder (i.e., enabled, not empty). This control page can be used to reactivate the feeder after it is put back into service.

System customizers can easily add similar menu pages to provide virtual control panels for other devices interfaced to the robot.

5. Sequence execution. Menu pages are provided that allow the user to initiate the execution of a sequence. Once started, the execution can be monitored via a status page (see Table 46). The status page displays the name of the sequence and assembly being executed, the statement being executed, the number of statements left in the sequence, and the robot speed. In addition, if sequence execution stops for any reason, a message indicating the stop condition is displayed. Also, from this menu, the operator may choose to stop execution, single step, or continue the assembly process from any point in the assembly sequence. These features make it easy to debug the assembly process or to shut-down or start-up the system in an orderly manner.

6. Sequence and assembly management. Since multiple sequences and assemblies can be independently defined, menu selections are provided for managing the creation, deletion, copying, loading, and storing of these databases.

The Menu Driver

The composition and processing of menu pages is determined by information stored in a disk-resident database. The Menu database defines the text to be displayed on the terminal screen, where the text is displayed, what commands are permitted, what action the commands should perform, and how to interpret and store any input data.

Since the Menu database resides on the disk, a virtually unlimited number of menu pages can be created and added to the system without affecting the available controller memory.

The menu driver converts information from the Menu database into a terminal screen of information for the user. The menu driver then waits for the operator to enter a command or data at the terminal keyboard. The following is a brief list of the possible menu commands:

Display a different menu page.

Display or modify the values of system control variables.

Display or modify binary input/output signal values. This allows the operator to monitor and modify the hardware control signals that interlock the robot with other equipment in the workcell.

Display an index of the records in a database and allow editing of the database. For example, the Part database can be accessed in this way.

Execute a standard function, or a function written by a system integrator.

Menu Database

The system includes a Menu database that defines a set of standard menus. This database can easily be modified to add new menu pages to the system as required.

The menu database defines the menus which are accessed through the operator's console. Each record in this database defines a single menu item. The item may be a page header, a comment, a menu selection, a subroutine spawn request, a database edit request, or a value display. The fields in a record define where the item is to be placed on the screen, how it is to be displayed, and how it can be modified. Multiple records are grouped (by menu page name) to generate a menu page.

Table 40 lists the record fields, in the order in which they occur within each menu record. The fields are summarized in Table 41. The database editor presents data using the format shown in Table 42. Table 43 indicates which fields are used for each menu item type.

TABLE 40

| # | Record Definition for the Menu Database | | | |
|---|---|---|---|---|
| | Field Name | Data Type | Size | Sort |
| 0 | menu page name | string | 15 | 1 |
| 1 | item type | byte | 1 | |
| 2 | print line | byte | 1 | 2 |
| 3 | label column | byte | 1 | 3 |
| 4 | label attributes | byte | 1 | |
| 5 | label | string | 80 | |

TABLE 40-continued

Record Definition for the Menu Database

| # | Field Name | Data Type | Size | Sort |
|---|---|---|---|---|
| 6 | read access level | byte | 1 | |
| 7 | write access level | byte | 1 | |
| 8 | value access | byte | 1 | |
| 9 | value column | byte | 1 | |
| 10 | value format | string | 1 | |
| 11 | value width | integer | 2 | |
| 12 | value digits | byte | 1 | |
| 13 | value | integer | 2 | |
| 14 | next name | string | 15 | |
| 15 | [next link] | integer | 2 | |
| 16 | next argument | integer | 2 | |

TABLE 41

Field Definitions for the Menu Database

| | |
|---|---|
| menu page name | The name of the menu page which contains the data specified in this record. |
| item type | A value which defines the type of menu item the record describes. The acceptable values and their meanings are:<br>1 Page Header   6 Binary signal display<br>2 Comment   7 Real value display<br>3 Menu selection   8 String value display<br>4 Subroutine spawn   9 Graphics box outline<br>5 Database editing |
| print line | The number of the screen line where the output is to be displayed. |
| label column | The number of the screen column where the first character of the label is to be displayed. |
| label attributes | A value defining the screen attributes (dim, blinking, etc) to be used when the label is displayed. For menu selections and subroutine spawns, the attributes apply to the label but not the selection number specified by the "value" field. The attributes are turned on by asserting individual bit flags. The value to be placed in this field can be determined by adding the appropriate bit mask values from the following list:<br><br>| Bit # | Decimal | Hex | Interpretation When Bit Set |<br>|---|---|---|---|<br>| 1 | 1 | 1 | Dim displayed characters |<br>| 2 | 2 | 2 | Blink characters |<br>| 4 | 8 | 8 | Underline characters |<br>| 5 | 16 | 10 | Display in reverse video |<br>| 6 | 32 | 20 | Use graphics character set | |
| label | A text string to be displayed on the terminal. |
| read access level | The required operator access level in order for the following to be allowed: a menu selection, a subroutine spawn, or read access to a variable. The value zero indicates that access is always allowed. |
| write access level | The required operator access level required in order for write access to a variable to be allowed. The value zero indicates that write access is always allowed. |
| value access | Bit flags indicating how the value of a variable is to be accessed. If bit #5 is set, the value field or menu selection item cannot be accessed while an assembly sequence is executing. The value to be placed in this field can be determined by adding the following mask values for the desired access:<br><br>| Bit # | Decimal | Hex | Interpretation When Bit Set |<br>|---|---|---|---|<br>| 1 | 1 | 1 | Allow read access |<br>| 2 | 2 | 2 | Allow write access |<br>| 3 | 4 | 4 | Automatically refresh display |<br>| 4 | 8 | 8 | Access a database field |<br>| 5 | 16 | 10 | Sequence cannot be running | |
| value column | The number of the screen column where the first character of the value is to be displayed. |
| value format | The output format for conversion of the contents of the "value" field of the displayed record. The acceptable values and their meanings are:<br>B = Binary ("ON" or "OFF")   I = Integer<br>D = VAL-II default   O = Octal<br>F = Fortran F format   Y = YES/NO<br>H = Hexadecimal |
| value width | The number of characters output during value conversion. The output is right justified in the output field if the value is positive. The output is left justified if the value is negative. |
| value digits | The number of decimal digits to be output when converting real numbers. |
| value | For menu selections, subroutine spawns and database |

TABLE 41-continued

Field Definitions for the Menu Database

| | |
|---|---|
| | editing, this is the number of the menu item (1 to n). For binary signals, this is the number of the I/O signal to be accessed. For control values and control strings, this is the index into the appropriate control variable array. For display of the field of a database, this is the number of the field. For menu page headers, this specifies: (1) the number of seconds between page refreshes (value > 0), or (2) the default refresh time is to be used (value = 0), or (3) refresh only when a value is changed (value < 0). |
| next name | For menu selections, this is the name of the menu to be displayed if this item is selected. For subroutine spawns, this is the name of the routine to be spawned. For database editing, this is the name of the form to be used to access the database. For page headers, this is the name of the optional page refresh routine. For value access, this is the name of the optional value check routine. |
| [next link] | This field value is automatically filled in by the menu tree-linking routine. For menu selections, this is the number of the record which corresponds to the "next" field. The value of this field is zero if no link exists. For page headers, this contains the number of items associated with the page. |
| next argument | For subroutine spawns, this is an argument that is passed to the spawned routine to identify the action that generated the spawn. For database editing, this is the number of the database to be edited. For display of a database record field, this is the database number. For page headers, this contains bit flags which indicate where the cursor is to be initially positioned and if type-ahead is to be ignored. |

TABLE 42

Standard Menu Record Form

```
                        MENU ITEM

Menu name: _____     Item type: ____    Print line: ____

Item type: header(1), comment(2), menu selection(3),
           subroutine spawn(4), db editing(5), binary signal(6),
           cntrl value(7), cntrl string(8), box(9).

Access levels:         Read: ____         Write: ____

Label information:     Print column: ____ Print attribute: ____
```

```
Value information:
    Access [read(1), wrt(2), auto rfh(4), db(8)]: ____   Value: ____
    Format
        [(F), int(I), bin(B), hex(H), octal(O), y/n(Y), default(D)]: ____
    Print column: ____  Print width: ____  Number of digits: ____

Subroutine and menu linkage:                 Next: ____
    Next argument: ____    [next link]: ____  Overlay file: ____

Help keyboard: ____
```

TABLE 43

Summary of Field Requirements for Menu Database Records

| | | | Menu Selection | | | Value Display | | | |
|---|---|---|---|---|---|---|---|---|---|
| Field Name | Page Header | Commnt | Menu Select | Subr Spawn | DB Edit | Binary Signal | Real Value | String Value | Box |
| menu page name | x | x | x | x | x | x | x | x | x |
| item type | 1 | 2 | 3 | 4 | 5 | 6 | 7 | 8 | 9 |
| print line | x | x | x | x | x | x | x | x | x |

TABLE 43-continued

Summary of Field Requirements for Menu Database Records

| Field Name | Page Header | Commnt | Menu Selection | | | Value Display | | | Box |
| --- | --- | --- | --- | --- | --- | --- | --- | --- | --- |
| | | | Menu Select | Subr Spawn | DB Edit | Binary Signal | Real Value | String Value | |
| label column | x | x | x | x | x | x | x | x | x |
| label attributes | x | x | x | x | x | x | x | x | x |
| label | x | x | x | x | x | x | x | x | |
| read acc. level | | | x | x | x | x | x | x | |
| write acc. level | | | | | | x | x | x | |
| value access | | | x | x | x | x | x | x | |
| value column | | | x | x | x | x | x | x | x |
| value format | | | | | | x | x | | |
| value width | | | | | | x | x | x | |
| value digits | | | | | | x | x | | |
| value | x | | x | x | x | x | x | x | x |
| next name | x | | x | x | x | x | x | x | |
| [next link] | [x] | | [x] | | | | | | |
| next argument | x | | | x | x | x | x | x | |

Key:
x Indicates a field which must be specified.
[ ... ] Indicates a field which is automatically filled in by the menu routines.

Menu Pages and Their Organization

The menu pages are organized into a tree-like structure, with the main page at the root. The main menu page (shown in Table 44) contains selections that can bring up other menu pages, which may themselves contain multiple selections. By making selections, and thus further defining the desired activity, the operator can move up the tree until the appropriate menu page is located. From any point in the menus, the operator may return to the MAIN menu with a single keystroke.

While the menu tree may contain an arbitrary number of menu pages, there are four basic types of menu pages:

1. Menu selection pages. These are used to call up other menu pages and invoke special functions.
2. Data display and modification pages. These can be used to construct virtual control panels.
3. Combination menu selection and data display and modification pages.
4. Database index pages. These display an index of a key field of a database and serve as entry points into the database editor.

Menu Selection and Subroutine Spawning Page

This is the most common type of menu page. It displays a series of choices and prompts the operator for a selection. When a menu item is selected, the menu driver will either display the next menu page or invoke a specified subroutine. The main menu page is of this type (see Table 44).

TABLE 44
MAIN MENU

| Operation & Maintenance | System Configuration |
| --- | --- |
| 1 Start execution | 7 Edit data |
| 2 Status and execution control | 8 Sequence and board utilities |
| 3 Hardware status and control | 9 Set systems access level |
| 4 Reports | 10 Cell setup and adjustment |
| 5 Help | 11 System customizing |
| 6 Exit to VAL-II | |
| Menu selection: _____ | |

Virtual Status and Control Panel Pages

This type of menu page allows the user to display and modify the values of binary control signals and special control variables. Many of the key system values (for example, the nominal robot speed and the current assembly sequence name) are stored in the special control variables so that their values can be accessed via the menu pages.

The format for displaying data can be specified and values can be accessed in read-only, write-only, or read-write modes. Values can also be marked as requiring automatic refresh. When a displayed menu page contain variables that require auto-refresh, the system automatically samples the values of the auto-refresh variables and periodically updates those values that have changed. This feature allows dynamic menu pages to be easily constructed.

An example of a virtual control panel is the menu page for accessing feeder status information shown in Table 45. This page dynamically displays the status of the binary control lines associated with the feeder selected. The current state of the input lines can be monitored and the state of output control lines can be changed from the keyboard via the menu page.

TABLE 45

Sample Virtual Control Panel
FEEDER CONTROL PANEL
Feeder name: gravity.feed.1   Part name: sn7400
Binary Control Signals:

| Signal Name | In/Out | Signal | Status |
| --- | --- | --- | --- |
| Feeder enabled | In/Out | 2050 | Yes |
| Part ready | In | 1023 | Yes |
| Feed a new part | Out | 72 | No |
| Feeder empty alarm | Out | −43 | No |

Next pallet position to be accessed (row/column): __/__

Combined Menu Selection and Data Display Pages

At times it is useful to display the values of variables on a page that includes menu selections. For example, the Status and Execution Control menu page shown in Table 46 displays the values of key execution control variables, and prompts for the next execution command when program execution has been stopped for some reason. The menu driver allows menu selection items to be freely mixed with data access fields. A menu selection page can even incorporate dynamic refresh fields if necessary.

TABLE 46

DATA ACCESS AND MENU SELECTION Menu Page

STATUS AND EXECUTION CONTROL

Sequence: Jib.build    Board: Jib.board    Robot speed: 100
Step 11 of 72          Loop 101 of 1000
Error at

TABLE 46-continued

DATA ACCESS AND MENU SELECTION Menu Page

Pause at end of...motion: Off  step: Off  Part inserted: Yes
action: Off  sequence: On

| | | |
|---|---|---|
| 1. Proceed | 4. Retry action | 7. Skip action |
| 2. Edit data | 5. Retry step | 8. Skip step |
| 3. Abort execution | 6. Show error | 9. Skip sequence |

Menu selection: _____

Database Index and Record Editing Pages

The final type of menu page displays an index of the records contained in a database. This menu page is similar to a menu selection page, except that the menu displays a list of all defined records within a specified database. This allows the operator to quickly view all of the data defined within a database and select particular records for further consideration. An example is shown in Table 47.

TABLE 47

Sample "Database Index" Menu Page
PARTS DATABASE

| | |
|---|---|
| 1 | cap.1uf |
| 2 | resistor.1k |
| 3 | sn7400 |

Menu selection: _____

When a menu item is selected from a database index page, the database editor is activated to edit that selected record.

RUNTIME SYSTEM

The runtime system is a collection of routines that directly control the robot's motion. The runtime system communicates with the user through the user interface routines, which run as a separate process.

The runtime system routines are organized into several functional groups: the scheduler, statement execution routines, primitives, strategy routines, and library routines.

Overview of Runtime Routines

Scheduler

The scheduler is responsible for determining which assembly sequence is to be run, how many times it is to be run, and the order in which the sequence steps are to be executed. Once a sequence has been selected, the scheduler executes the sequence by extracting individual statements from the Sequence database and calling the appropriate routines to execute the statement.

After each assembly sequence, the scheduler calls the "conveyor control routines" to move the completed assembly out of the work cell and move a new assembly in. The conveyor control routines can either perform the required operations directly or, if necessary, they can interface to a process control task in the robot system controller.

The scheduler used in the preferred embodiment (see Appendix 2) executes a single sequence selected by the system operator. Steps are executed sequentially, and failures request operator intervention. If required, the scheduler can easily be modified to dynamically select the assembly sequence, using a sensor such as a barcode reader.

Statement Routines

Associated with each task-level statement is a routine that is called to perform the required function. This routine is called with an argument list identifying each of the argument values specified in the step. For example, the statement TRANSFER PART sn7400 TO u20 calls the routine "transfer" and passes arguments corresponding to the "sn7400" record in the Part database, and "u20" in the Assembly database. The statement routine reads the database records corresponding to its arguments, executes code and calls primitive and library routines to perform the assembly operation, returning a status message indicating the success or failure of the operation. When adding a new statement to the system, the customizer must add a corresponding statement routine.

High-Level Primitives

Most assembly operations can be divided into several actions, such as "acquire a part" and "insert the part".

All "acquire a part" actions tend to be quite similar, even for different parts. This allows a single action routine to be shared by many assembly operations. Shared routines that correspond to such actions are called "high-level primitives". Therefore the system has standard primitive routines for actions such as "acquire", "insert", and "reject". These routines are called from within statement routines to perform standard actions. This minimizes duplication of code and simplifies the writing of new statement routines.

Strategy Routines

As mentioned above, standard actions such as "acquire a part" tend to be quite similar; however, they often differ in details related to the physical package of the part. These details are found in "strategy routines" that are named in the Part Type database. For example, the high-level primitive routine to acquire a part calls the appropriate acquire strategy routine to operate the feeder, operate the robot gripper, and perform fine robot motions while acquiring a part. The preferred embodiment has strategy routines for "acquire", "insert", and "reject" that correspond to the high-level primitives. To handle a new type of part, a system customizer may only need to write new strategy routines for that part type, while using the existing statement routines and high-level primitives.

Library Routines

Besides high-level actions, a real assembly operation requires a number of lower-level routines for reading from databases, performing robot motions, moving along paths, and communicating with the operator. The standard runtime library in the system provides routines that may be used by a system customizer when writing any of the other types of routines mentioned above.

Pause Modes and Walk Through Training

In order to step slowly through an assembly operation, the user can select one or more pause modes. These selections cause the runtime system to pause and display a message on the system status page. Pauses can occur:

1. At the end of each robot motion.
2. At the end of each assembly action.
3. At the end of each assembly step.
4. At the completion of each assembly sequence.

The operator can continue execution as if the pause had not occurred, or can select any of the error responses listed in Table 49.

When setting up, debugging, or fine-tuning an assembly cell, it is convenient to cycle the robot through an assembly operation, starting, stopping, repeating, and modifying the operation as necessary. Furthermore, it is sometimes difficult or impossible to train certain robot motions or define certain data unless the robot is actually performing the operation. In these situations, the operator can select "walk through training" mode, which caused the runtime routines to generate trace messages on the runtime status display and allows interactive training of data in the databases. This mode is less efficient than normal runtime execution, so it is used only for training.

During normal execution, all required data must exist in the databases or an error message is generated. Normally, when the runtime routines read from a database, they signal an error if a data value is not defined. When an undefined data value is encountered during walk-through training mode, the runtime routines send a message to the operator and then pause, waiting for an operator response. The operator can select the "edit data" option, which automatically invokes the database editor and positions it at the undefined field for entry or teaching.

To train robot locations, an operator can define all the data except the locations, and start execution with walk-through training enabled. He will then be prompted to define each location as it is needed.

To modify existing data, the operator can also select "edit all data" mode. In this mode, the runtime routines pause and prompt for editing of all data items specially flagged (by bit #5 in the item's field attributes, as shown in Table 1), even if they are already defined.

The status page for walk-through training is shown in Table 48. It includes all the standard status information and adds a scrolling window where trace, pause, and error messages are displayed. It also contains selections for enabling the disabling walk-through mode and edit all data mode.

| Appendix | Description |
|---|---|
| 1 | Menu Scheduler |
|   | initiates execution of an assembly sequence |
| 2 | Runtime Scheduler |
|   | main loop for the runtime system |
| 3 | Transfer |
|   | exemplary statement routine |
| 4 | Acquire |
|   | primitive routine for acquiring a part from a feeder |
| 5 | Ac.Standard |
|   | part acquisition stragegy routine |
| 6 | Ac.Pallet |
|   | acquires part from a pallet |
| 7 | Insert |
|   | primitive routine for handling insertion of part into an assembly position |
| 8 | In.Standard |
|   | part insertion strategy routine |
| 9 | Reject |
|   | primitive routine for rejecting a part |
| 10 | Rj.Standard |
|   | part rejection strategy routine |
| 11 | Search |
|   | performs spiral search for finding location to insert a part |
| 12 | Do.Search |
|   | moves the robot during a search operation |

Pseudocode

Pseudocode is, essentially, a computer language using universal computer language conventions. While the pseudocode employed here has been invented solely for the purposes of this description, it is designed to be easily understandable to any computer programmer skilled in the art. The computer programs in the preferred embodiment are written in the robot programming language VAL-II, which is described in the VAL-II Reference Guide, produced by Adept Technology, Inc. of San Jose, Calif.

The following are some notes on the syntax of this pseudocode:

Comments. Comments, i.e., nonexecutable statements, begin with a semicolon ";". All text on the rest of that line, after the ";", is a comment.

Multiline Statements. Statements continue from line to line as needed.

If Statement. There are two versions. For the one statement version the syntax is:

TABLE 48

Sample "Walk-Through Training Status and Execution Control" Menu Page
WALK-THROUGH TRAINING STATUS AND EXECUTION CONTROL

```
      Sequence: sample.sequence   Board: sample.board   Robot speed: 100
              Step   1 of 20 :     Loop    1 of 10
                  TRANSFER PART socket.40.pin TO u42f
   >Waiting to start execution
    Execution started
    Starting assembly: "sample.board"
    Acquiring: "part:socket.40.pin"
    Setting tool to NULL
   >Undefined value-edit: "feeder:dipl - location"
Pause after..  motion:  Off    step:  Off    Edit all:     Off    Part inserted: No
               action:  Off    seq.:  Off    Walk thru:    On
Operator Choices:
    1.   Proceed          4.   Retry action      7.   Skip action
    2.   Edit data        5.   Retry step        8.   Skip step
    3.   Abort execution  6.   Show error        9.   Skip sequence
Menu selection: _____
```

Detailed Description of Runtime Routines

Appendices 1–12 contain pseudocode representations of the following routines:

IF -condition- -statement-.

For the block statement version the syntax is:

```
IF -condition-
    -block of statements-
ELSE                                        - optional
    -block of statements-                   - optional
END
- Loops. The syntax forms used for loops are:
While (condition) DO
    -block of statements-
END
DO
    -block of statements-
UNTIL (condition)
FOR -index- = -first- TO -last- {STEP -stepsize-}
    -block of statements-
END
```

Sequence Execution Control

Error Response Codes

Each primitive routine in the runtime system returns an error response code indicating whether or not the operation succeeded. If the operation did not succeed, the error response code indicates what action the calling routine should take.

The same codes are returned by the operator interface as operator responses to error conditions. These responses correspond to the menu selections found on the STATUS AND EXECUTION CONTROL menu page (see Table 46).

Table 49 lists the symbols defining the operator error response codes. The interpretations of the codes are described in more detail the section "Error Handing", below.

TABLE 49

Operator Error Response Codes

| Variable Name | Interpretation |
| --- | --- |
| rn.opr.abort | The sequence is stopped and the scheduler routine exits. |
| rn.opr.fail | The current operation failed due to error anticipated by software. |
| rn.opr.next | Skip Statement |
| rn.opr.reject | Skip sequence, call conveyor reject routine to reject assembly. The scheduler then starts at the beginning of the sequence with a new assembly. |
| rn.opr.retry | Retry Statement. Used by routines which do not process their own retries. |
| rn.opr.restart | Restart current or previous statement if this value is returned by a statement primitive or a pause at the end of a statement. |
| rn.opr.skip | Skip Action (ignore any error). Only primitives handle skip action requests; the scheduler treats skip requests as a "proceed" response. |
| rn.opr.success (= 0) | Proceed (operation successful). This is the normal non-error case. Execution can proceed normally. |

Note that the success code "rn.opr.success" has the value FALSE and all the other response codes are interpreted as having the logical value TRUE. This scheme enables efficient checking of the "error" code using an IF instruction.

Communications Between the Operator and the Runtime

All communication with the operator is channeled through the operator interface task (the "front end") (see FIG. 3). Immediately after system startup, the front end attaches the system terminal and does not release control until AIM terminates execution. This means that the front end must receive commands from the operator to start, stop, and proceed sequence execution and must communicate this information to the runtime task. The runtime task must in turn be able to communicate program status information back to the front end for output to the operator since the runtime is prohibited from directly writing to the system terminal.

This communications interface between the runtime task and the front end is implemented using global variables. Within the front end, the communications interface is handled entirely by standard system routines. Within the runtime task, almost any new software routines which are written must make use of this interface.

The communications interface is described in this section, from the perspective of the runtime task.

Error Display and Operator Responses

The runtime execution routines communicate with the operator interface task by using the system routines "rn.message" and "rn.error" to send messages to the operator and the data logger.

The routine "rn.message" handles informative and trace messages as follows:

In normal execution mode, no messages are sent to the operator terminal.

In walk-through training mode, all messages are sent to the operator terminal.

In either mode, all non-trace messages are sent to the data logger.

The routine "rn.error" handles error messages, edit requests, and pause messages. All such messages are displayed at the operator terminal. Only error messages are sent to the data logger. If the message has a database associated with it, the runtime enters "teach wait" mode; otherwise it enters "error wait" mode. The error value returned by "rn.error" indicates the operator response. The operator error response code variables are shown in Table 49.

Runtime Status Indicators

The status of the runtime system is indicated by several global variables: "rn.sched.act" indicates if the scheduler is active; the "rn.mode" indicates the current runtime mode of operation. "rn.mode" can have the following values: iwait (runtime is idle, waiting for a command from the operator or from the menu task), exec (the runtime is actively executing a sequence), owait (the runtime is waiting for an operator response to be entered), twait (the runtime is waiting for some data item to be taught, followed by an operator response), rn.mode.teach (the runtime is executing in manual control pendant teach mode).

Pausing and Single Stepping

Sequence execution ends automatically whenever the sequence loops-completed count reaches the total number of loops specified. To stop execution at any other time, the operator must use one of the pause modes shown in Table 50. Pause modes suspend execution and wait for the operator to enter a response. If the "Proceed" menu item is selected, execution continues just as if the pause did not happen.

Pause modes do not automatically clear themselves, but must be specifically reset by the operator. Single stepping is performed by leaving one or more pause modes set and selecting "Proceed" each time the pause occurs. Otherwise, the operator must reset the pause mode before proceeding.

Pause mode is entered by selecting the STATUS AND EXECUTION CONTROL menu page (shown in Table 46) and turning on one of the "Pause . . . " menu selections. Pausing may be specified to occur in the following situations, which correspond to the menu selections:

1. Pause at the end of the current sequence. Execution stops when the current sequence is completed, but before starting on another sequence. This mode is used for orderly shutdown in normal production. It is handled by the scheduler. See the description of the sequence scheduler below for more details.

2. Pause at the end of the current statement. Execution stops when the current statement is completed, possibly in the middle of a sequence. This mode is used for setup, debugging, and error recovery. It is handled by the runtime scheduler, described below.

3. Pause at the end of the current action. Execution stops when the current action is completed, possibly in the middle of a statement. This mode is used for setup, debugging, and error recovery. It is handled by the primitive routines. See the description of the primitive routines below. (The definition of an action depends upon the primitives being called.)

4. Pause at the end of the current motion. Execution stops when the current robot motion is completed, possibly in the middle of an action. This mode is used for setup, debugging, and error recovery. It is handled transparently by the low-level motion primitive routines.

The global variables which control pause modes are shown in Table 50. They are set and cleared from the STATUS AND EXECUTION CONTROL menu page, and tested by the various runtime routines. The indicated pause mode is enabled when the corresponding variable is set to TRUE.

TABLE 50

| Pause Mode Global Variables | |
|---|---|
| Type of Pause | Variable Name |
| Motion | cv.stp.mtn |
| Action | cv.stp.action |
| Statement | cv.stp.stm |
| Sequence | cv.stp.seq |

As described in the motion primitives section, pausing at end of motions must sometimes be disabled, even when selected by the operator. The global variable "rn.move.sstep" is logically "AND'ed" with the pause-at-end-of-motion switch, temporarily disabling single stepping. A user program may temporarily set this switch to FALSE, but must return it to TRUE after the critical robot motions have been performed.

SEQUENCE SCHEDULER (See Appendices 1 and 2)

The sequence scheduler is the top-level runtime routine, named "rn.sched". It determines which assembly sequence to run and how many times it should be run. The scheduler executes the individual statements of the sequence by extracting them from the Sequence database and calling the appropriate statement routines. The operator error response code values returned from these routines are used to modify the normal sequence execution order when appropriate.

The scheduler calls conveyor control routines to move assemblies into the workstation before sequence execution and to move completed or rejected assemblies out of the workstation.

Operator requests to pause at the end of the sequence or at the end of each statement are recognized and processed.

The default scheduler is shown in Appendix 2. It handles only one assembly and assembly sequence at a time. The scheduler can be modified by a system customizer to handle automatic assembly and sequence selection, or multiple workstations.

Global Parameters. The operation of the scheduler is specified by a number of global variables which are set up by the menu routine "mu.sched", shown in Appendix 1. The menu scheduler routine displays a special menu page when execution startup is selected so that the operator can set the values of the control parameters.

The parameters associated with operation of the scheduler are summarized at the top of Appendix 2. The values of these parameters must be set up before the scheduler is started. During scheduler operation, and when the scheduler stops, the value of the real variables "cv.c.step" and "cv.completed" indicate the current status of the scheduler.

Start and Stop. The global variable "rn.sched.act" is a boolean which is TRUE when the scheduler is active. When the scheduler is not active (rn.sched.act=FALSE) and the runtime is idle (rn.mode=rn.mode.iwait), the scheduler is started by the menu routine "ex.mu.start" which is spawned by the menu driver from the START EXECUTION menu page (see Table 51). That routine causes the runtime to call the scheduler routine "rn.sched".

In walk-through training mode, the scheduler pauses immediately and waits for the operator to proceed or abort execution.

TABLE 51

START EXECUTION

Sequence: _____ Board: _____ Robot speed: _____

Step ____ of ____    Loop ____ of ____

____ Start sequence execution    ____ Start walk thru training

Menu selection: _____

The scheduler remains in control until one of the following conditions occurs:

An "abort execution" operator response is received from a call to the operator error reporting routine, "rn.error".

An "abort execution" error response is returned from a call to a primitive routine.

All requested loops of the assembly sequence have been completed.

When the scheduler starts and stops, it sends informative messages to the data logger, and also to the operator during walk-through training.

Pausing. The scheduler handles the pause-at-end-of-statement and pause-at-end-of-sequence operator functions. After each statement routine call, if there is no operator error response indicated, the scheduler checks the global control variable "cv.step.stm". If its value is TRUE, the operator is notified via a call to "rn.error" and the operator response is treated as if it were the error response return from the statement routine.

After each sequence has been completed, the scheduler checks the global control variable "cv.stp.seq". If its value is TRUE, the operator is notified via a call to "rn.error" and the operator response is processed.

Error Handling. Operator error responses values from statement primitive routines and conveyor control routines are handled by the scheduler. See Table 49.

In addition, the control variable "cv.ins.success" can be checked to see if the part insertion was successful. Due to operator intervention, it is possible for a statement primitive to complete with success without having inserted a part.

Conveyor Control. The scheduler calls three hardware dependent routines to operate the conveyor. These routines either operate the conveyor directly or interface to a process control task which operates the conveyor. The three routines are "rn.get.assembly", "rn.put.assembly" and "rn.rej.assembly". The function of these routines is described briefly in Table 52.

TABLE 52

| | |
|---|---|
| rn.get.assembly | Operates the conveyor to obtain a new assembly. Returns "rn.opr.success" when the assembly is in place. |
| rn.put.assembly | Operates the conveyor to move a completed assembly out of the workspace. (The assembly was completed without errors.) |
| rn.rej.assembly | Operates the conveyor to move a rejected assembly out of the workspace. (The assembly contains errors.) |

In general, the reject routine causes external equipment to send the assembly to a reject bin and/or communicate with other equipment such that the assembly is marked as in error. Likewise, the accept routine indicates that the assembly was successfully completed and causes the assembly to be removed from the cell via external conveyor, or some other means.

The accept and reject routines return an error response code which is examined by the scheduler. This code may indicate, for example, a catastrophic failure of the conveyor. It is also possible for the operator to intervene and request that the conveyor operation be retried or that the assembly cease altogether. The scheduler responds to these error response codes by jumping to the proper sequence statement.

Scheduler Algorithm. The scheduling algorithm used by the exemplary scheduler shown in Appendix 2 is described below. This scheduler handles only a single assembly and assembly sequence which is determined by the START EXECUTION menu page.

1. If in walk-through training, wait for a proceed response from the operator.
2. Send a startup message to the menu.
3. Initialize variables before entering the main loop.
4. Enter the sequence execution loop. This loop is executed until the current loop count equals the final loop count. Within this loop an entire sequence is executed.
5. If the first step in the sequence is about to be executed, send an "assembly starting" message to the operator and data logger. Then call the conveyor control routine to bring a new assembly into the workspace. If that routine returns an error response code, the scheduler branches to the appropriate place.
6. Enter the inner loop which executes the statements of the sequence. This loop is executed until the current step number equals the final step number. Note that this loop can be entered initially with a current step greater than one.
7. Update the global reference frames if necessary.
8. Initialize the control variable "cv.ins.success" to FALSE.
9. Open the statement record and extract the statement routine name string and the values of its arguments. Call the statement routine with the specified arguments.
10. Examine the error response code returned by the statement routine. If "stop at end of statement" is selected, and no previous operator error response is pending, call the pause routine to obtain an operator error response.
11. If the response code is "abort", the scheduler exits the scheduling loop. If some other action is specified, such as "retry statement" or "skip statement", branch to the proper point in the scheduler loop and continue execution. If no error occurs, branch to the top of the inner loop and execute the next statement.
12. A sequence has been completed when the inner loop is exited. Call the conveyor control routine to move the completed assembly out of the workspace. Then send an "assembly completed" message to the operator and data logger.
13. If "stop at end of sequence" is selected, call the pause routine to obtain an operator error response.
14. Loop until all the requested assemblies have been completed. When they are completed, send an "execution stopping" message to the operator and exit.

Statement Routine (See Appendix 3)

Statement routines, such as the TRANSFER statement routine shown in Appendix 3, execute the statements in the currently selected sequence database. The runtime scheduler determines the statement routines to be used by extracting the first field of each sequence database record and calling the statement routine with that name.

Statement routines are typically a short series of instructions for opening the databases used by the statement, and then calling the high level primitives needed to execute each of the basic operations associated with the statement. The high level primitives use the database records specified in the sequence statement to determine the specific robot operations needed to execute each of the high level operations associated with the statement.

High Level Primitives

The higher level runtime primitive routines described below perform complicated operations such as acquiring a part from a feeder or inserting a part into an assembly. For most applications, these primitives are sufficiently general to be used without modifications. Those actions of the primitive which are hardware specific are dealt with by special strategy routines which are called by the main primitive routines. A new strategy routine will typically have to be written when new hardware is integrated.

In some situations, new primitives may have to be added to the system. New primitives can be written by copying and modifying the standard primitives or they may be written as entirely new routines.

It should be kept in mind that primitives are not fundamentally required for the implementation of new statements. Primitives are simply general purpose routines that perform high level actions which are used often. If an existing primitive can be employed in the development of a new statement, its use will obviously reduce the development effort. As such, primitives are not always called from statement routines. If required, a primitive can be called by another primitive or any other runtime routine.

Acquire Primitive (see Appendix 4)

The acquire primitive is called to acquire a part from a feeder. This primitive is able to handle a wide variety of standard feeders by calling special strategy routines which understand specific types of feeders.

When the acquire primitive is called, it assumes that the robot does not have a part in its gripper and it is ready to pick up the next part. Upon successful completion of the primitive, the robot will be moving away from the feeder with a part in its gripper. More specifically, the following sequence of actions is performed by the acquire primitive:

1. Move along an optional path to the appropriate feeder.
2. Move to an optional transit location in front of the feeder.
3. Move to an approach location above the part grip location.
4. Move to the part grip location and grip the part.
5. Move to a depart location above the part grip location.
6. Move to the same optional transit location in front of the feeder.
7. Move along an optional path in preparation for the next operation.

This series of actions is performed by two separate routines: a main acquire routine which selects a feeder; and a part acquisition strategy routine which handles the operation and actual acquisition of the part from the selected feedrer (steps 3 to 5 above).

The feeder selection routine "rn.acquire" calls the part acquisition strategy routine specified by the part type to be acquired (i.e., by the acquire routine field of the part type record for the next part to be handled by the robot). The system customizer will normally have to write one or more part acquisition strategy routines to handle special feeders and grippers.

Acquire Routine Specifics

The main acquire routine "rn.acquire", shown in Appendix 4, is called for all parts. This routine handles multiple feeders which contain the same part, selecting one according to the algorithm described below.

Feeder Control Signals and Parameters. The acquire routine expects that all feeders have the following control parameters:

1. Enable. A software signal which indicates that the feeder is enabled. Feeders which are not enabled are ignored. Feeders may be disabled by the operator or by a part acquisition strategy routine. Feeders may be enabled by the operator or by a PC program.
2. Ready. An optional hardware input signal which indicates that a part is ready to be fed and grasped. If omitted, the feeder is assumed to always be ready, subject to timing constraints.
3. Cycle-Time. A cycle-time value which indicates how long a feeder takes to become ready. The feeder will not be accessed for at least this long after it has fed a part, even if the part-ready signal becomes TRUE.
4. Max-Time. A time-out value which indicates the maximum amount of time to wait for a feeder to become ready.
5. Feed-Part. An optional output signal which is enabled immediately before the robot attempts to grasp the part.
6. Alarm. An optional output signal which is enabled whenever a feeder fails to feed a part as expected. This signal can be connected to an alarm, for example.

Acquisition Process. The main acquire routine follows the algorithm described below. Refer to the feeder record description above for details on the data structure.

1. Call the routine "rn.update.tool" to make sure the current robot tool is the correct one for this part. The new tool to use may be specified by an argument to "rn.acquire". If not specified, the tool is read from the Part Type database. If the current tool is different from the desired one, the Tool database is read to obtain the new tool transformation. See the Tool database description above for more details.
2. Check if an optional feeder approach path is specified. If so, enter the path and move along it toward the first exit location.
3. Scan through all the feeders indicated by the desired part, looking for one which is enabled, has its ready signal set, and which has not been accessed for a specified time interval. The scanning begins with the feeder which was accessed most recently, which tends to empty one feeder before moving on to the next.
4. If no feeders are ready, continue moving along the feeder approach path until the first enabled feeder is reached. Wait there until a feeder becomes ready. An error is signaled if there are no feeders available after the specified time-out interval.
5. When a feeder becomes ready, and an approach path is specified, move along the path to the appropriate exit location (i.e., move to the exit point closest to the feeder).
6. If the optional feeder transit location is defined, move to it.
7. Read the name of the part acquisition strategy routine from the Part Type database and call that routine to acquire the part. The location values passed depend upon the relative motion bits set in the motion type bit word. See the following section for details on that routine.
8. If the part acquisition strategy routine returns a "retry action" error response code, loop and scan the feeders again. If the error response code "skip action" is returned, "rn.acquire" assumes that a part was obtained and returns with success. If any other error response is returned from the routine, "rn.acquire" exits with that error response.
9. If the optional feeder transit location is defined, move to it again.
10. If no errors occur, then "rn.acquire" exits with the part in the robot gripper and the robot either completing the last motion requested by the part acquisition strategy routine, or moving to the transit point (if it is defined).

Part Acquisition Strategy Routine (see Appendix 5)

Each part has an associated part type, and each part type specifies the name of a part acquisition strategy routine. That routine is called by the main acquire primitive routine. ("rn.acquire") as described previously.

A separate part acquisition strategy routine may exist for every different type of part in the system. As shown by the "standard" integrated circuit acquisition strategy routine "rn.ac.standard" in Appendix 5, these routines perform the following steps:

1. Verify that the gripper is open and that any part-present sensors are in the correct state.

2. Move the robot to the part pickup location at the selected feeder.

3. Activate the feeder and grip the part.

4. Set the motion speed to use while the part is in the gripper (using the "speed when holding part" value in the part type database).

5. Verify that any part-present sensors are in the correct state.

6. Depart from the pickup point.

In addition, the part acquision strategy routine handles expected error conditions and takes appropriate action—such as disabling the feeder or retrying the acquire operation.

Insertion Primitive

Parts are inserted into an assembly location using the part insertion primitive "rn.insert", shown in Appendix 7. This primitive can be called immediately after the part acquisition primitive (as in the case of the "TRANSFER" statement) or after other primitives have performed other operations (such as part inspection or position refinement). This routine calls part insertion strategy routines to handle different types of parts.

Before calling this routine, the part must be held in the robot gripper with the proper tool transformation selected. Upon successful completion of the routine, the robot has inserted the part into the assembly and retracted to an safe location. The insertion routine generally moves the robot as follows:

1. Move along an optional path to the assembly.

2. Move to an approach location above the part insertion location.

3. Move to the part insertion location and insert the part.

4. Move to a depart location above the part insertion location.

5. If the insertion failed, move along an optional reject path and discard the part.

6. If no reject path was taken, move along an optional path in preparation for the next operation.

The full part insertion procedure is performed by two routines: a main primitive routine "rn.insert" which handles the optional paths before and after the insertion; and a part insertion strategy routine which handles the actual insertion of the part and the tool operation. The main insertion routine calls the part insertion strategy routine indicated by the part type of the part to be inserted. The main routine is intended to be used "as is" for most applications, although it can be modified if necessary. The system customizer will normally have to write one or more part insertion strategy routines to handle special parts and grippers.

Insertion Routine Process

Parts are normally inserted by calling the main part insertion primitive routine "rn.insert" which performs the following steps to set up for inserting a part. Refer to the Assembly database record description, above, for details on the data structure.

1. Check if an optional assembly approach path is specified. If so, enter the path and move along it toward the first exit location.

2. Read the assembly location from the Assembly database and move along the path to the appropriate exit location.

3. Move to the assembly approach location.

4. Read the name of the insertion strategy routine from the Part Type database and call that routine to insert the part. See the following section for details on that routine. It is assumed that the strategy routine performs any required depart operation.

5. If the insertion strategy routine returns a response code of "rn.opr.retry" (retry action), loop and repeat the previous two steps.

6. If the insertion strategy routine returns a response code of "rn.opr.fail" (operation failed), and an optional reject path is specified, call the primitive routine "rn.reject" to reject that part. If no optional path is specified, report the insertion failure to the operator and wait for an operator error response. (For example, the operator may respond by manually rejecting the part and then instruct the system to retry the action. On the other hand, he may instruct the system to abort the assembly.)

7. If any other error response is returned, exit from "rn.insert" with that response.

8. If the error response indicates success and the optional assembly depart path is specified, enter the path and move along it to the first exit location.

9. If no errors occur, then "rn.insert" exits with the part inserted in the assembly, the robot gripper empty, and the robot either executing the last motion requested by the insertion strategy routine, or moving along the optional depart path (if one is defined by the statement being executed).

Part Insertion Strategy Routine (see Appendix 8)

Each part has an associated part type, and each part type specifies the name of a part insertion strategy routine. That routine is called by the main insertion primitive routine ("rn.insert") as described previously.

A separate insertion strategy routine may exist for every different type of part in the system. These routines should perform the following steps:

1. Verify that the gripper is closed and that any part-present sensors are in the correct state.

2. Approach the assembly location and insert the part using the appropriate strategy.

3. Open the gripper to release the part.

4. Indicate successful insertion by setting the system control variable "cv.ins.success" to TRUE, and setting the part-in-hand speed factor "rn.part.speed" to 1.

5. Depart from the insertion location.

6. Verify that any part-present sensors are in the correct state.

In addition, the insertion strategy routine handles all expected error conditions and take appropriate action, such as retrying the insertion operation or automatically executing a search algorithm to find the proper location for inserting the part in the gripper.

An example of a part insertion search routine is shown in Appendices 11 and 12.

The insertion routine described above is only one example of how an assembly operation can be handled by the present invention. The actual steps used, and their order, will depend on the particular parts being assembled and gripper(s) being used.

Part Insertion Search Routine (see Appendices 11 and 12)

When a part insertion fails, the problem may be that the insertion point on the current assembly is slightly offset and/or rotated from its specified location. To solve this type of offset problem, the search routines shown in appendices 11 and 12 may be used.

When the search routine is called, the following database records are open, positioned at the correct record, and ready for access: Part, Part Type, and Assembly. The robot is ready to move to the approach location above the assembly location. The assembly location data is found in the Assembly database.

The data required to perform a search operation for the insertion is found in the Part Type database. The fields which are used are:
  search step size along x
  maximum search along x
  search step size along y
  maximum search along y
  search step size about z
  maximum search about z
  depart distance during search The primitive routine "rn.search" searches for the actual assembly location by attempting insertion at each location in a square spiral pattern. Thus the search routine steps the gripper to a series of locations surrounding the specified assembly location. At each location the search routine attempts insertion at a specified set of different rotational positions (specified by the search step size about z and the maximum search about z, where the step size is specified in degrees).

If the insertion attempt is successful, the routine exits and returns parameters which indicate the location where the part was inserted. Otherwise the search continues until all of the search locations have been tried. If the search is not successful, the part insertion routine will generate an error message, thereby giving the operator the opportunity to instruct the system whether to retry the insertion, to abort the assembly, or to skip this step and move onto the next statement.

Reject Primitive (see Appendix 9)

The part reject primitive is called to discard a defective part which is currently held in the robot gripper. It is normally called when a part insertion routine fails or a part inspection routine detects a bad part. This routine calls part reject strategy routines to handle different types of parts.

Before calling this routine, the part must be held in the robot gripper with the proper tool transformation selected. Upon successful completion of the routine, the robot will have moved the part to a specified location and retracted to a safe location. The reject routine generally moves the robot as follows:
1. Move along a path to the first exit point.
2. Activate the gripper to release the part.
3. Continue along the path to the next exit point.

The full part reject procedure is performed by two routines: a main primitive routine "rn.reject" which handles the path motion before and after the gripper action; and a part reject strategy routine "rn.rj.standard" which operators the gripper to release the part. The main reject routine calls the part reject strategy routine appropriate for the part type of the part to be rejected. The main routine is intended to be used "as is" for most applications, although it can be modified if necessary. The system customizer will normally have to write one or more part reject strategy routines to handle special parts and grippers.

Reject Routine Specifics

Parts are normally rejected by calling the main part reject primitive routine "rn.reject" (shown in Appendix 9), which performs the following steps. Refer to the Assembly database record description for details on the data structures.
1. Check if an optional reject path is specified. If not, skip all the remaining steps.
2. Enter the reject path and move along it toward the first exit location.
3. Read the name of the reject strategy routine from the Part Type database and call that routine to reject the part. (See the following section for details on that routine. It is assumed that the strategy routine operates the gripper to release the part.)
4. If any error response is returned, exit from "rn.reject" with that response.
5. If the error response indicates success, continue moving along the path to the next exit location.
6. If no errors occur, "rn.reject" exits with the part placed at the reject location, the robot gripper empty, and the robot moving toward the second exit point on the reject path.

Part Reject Strategy Routine (see Appendix 10)

Each part has an associated part type, and each part type specifies the name of a part reject strategy routine. That routine is called by the main reject primitive routine ("rn.reject") as described in the previous section. An exemplary reject strategy routine "rn.rj.standard" is shown in Appendix 10.

A separate reject strategy routine may exist for every different type of part in the system. These routines perform the following steps:
1. Wait for the current robot motion to complete by calling "rn.break".
2. Open the gripper to release the part.
3. Verify that any part-present sensors are in the correct states.

In addition, the routine must handle any expected error conditions and take appropriate action, such as retrying the reject operation. The actual steps included, and their order, will depend on the particular part and gripper.

Low Level Primitives

The low level primitives are simply general purpose routines that perform fundamental functions which are used often. The fundamental functions can be categorized into the following groups: robot motion functions, path motion functions, operator interface functions, and database access. The higher level primitives need not use the low level primitives supplied in the preferred embodiment, but their use greatly simplifies the generation of customized routines.

The following is a description of the low level primitives used in the exemplary runtime software shown in the Appendices.

Error Trapping

Robot-related errors (such as a failure to power or start the robot, pressing the PANIC button on the operator console, an electrical or mechanical failure in the robot, or the robot receives a command to move to a position which it cannot reach) cause any robot motion in process to step immediately. The error is reported the next time any robot motion primitive routine is called, or when the error check routine ("rn.check") is called. When such an error occurs, the robot destination is saved. An operator response of "Proceed" results in the robot continuing to its destination.

Pause at End of Motion

The motion primitive routines also handle signle stepping of robot motions. Single stepping is enabled by the "Pause at end of motion" operator control switch on the STATUS AND EXECUTION CONTROL menu page (Table 46). This switch controls the value of "cv.stp.mtn". While in motion single-step mode, a motion primitive waits for the motion to complete and then sends a pause message to the operator.

Note that in this mode the primitive does not exit until the motion is complete. This behavior would make it impossible to write a sensor monitoring loop which follows a motion primitive and is supposed to stop the motion early if a sensor is triggered. It is possible to override the operator switch setting and temporarily disable motion single stepping by setting the global variable "rn.move.sstep" to FALSE before calling a motion primitive routine. It is important that the variable be set to TRUE when motion single stepping is allowed again.

Simple Motion Sequences

The simplest robot motion sequence is: (1) establish a reference frame, (2) move to the location. This motion sequence is used for transit points. Another common motion sequence is: (1) establish a reference frame, (2) approach a location, (3) move to the location, and (4) depart from the location. This motion sequence is used for acquiring and inserting parts.

The preferred embodiment includes a set of motion primitive routines which efficiently fetch the data for these sequences, and which also handle interactive training of the data. Whether or not a sequence includes approach and depart locations is specified in the database by field attribute bits on the location field. See the discussion of "Field Attribute Bits", above, for more details on field attributes.

In the preferred embodiment, when a robot motion (a "Call Move" instruction, in the pseudocode versions of the routines shown in the Appendices) is performed, the motion primitive routines shown in Table 53 are used.

TABLE 53

| Routine | Motion Primitive Routines Description |
|---|---|
| rn.get.frame | Reads the motion type bits and appropriate reference frame data in preparation for a motion sequence. This routine allows interactive definition or editing of the reference frame data. |
| rn.get.motion | Reads location and motion parameter data from a database in preparation for the motion sequence. Approach and depart data is optionally read as determined by the field attribute bits. This routine allows interactive definition or editing of the data. This routine must be called before any of the following routines. |
| rn.move.app | Moves the robot to the approach location read by "rn.get.motion". This routine is called only if the field attributes indicate that this motion sequence includes approach and depart data, and it |

TABLE 53-continued

| Routine | Motion Primitive Routines Description |
|---|---|
| | does not allow definition or editing of the data. |
| rn.move.loc | Moves the robot to the basis location fetched by "rn.get.motion", and allows interactive definition or editing of the data. |
| rn.move.dep | Moves the robot to the depart location read by "rn.get.motion". This routine is called only if the field attributes indicate that the currently executing motion sequence includes approach and depart data. This routine allows interactive definition or editing of the data. |

Path Motion Low-Level Primitives

Paths are a means for specifying a complex trajectory consisting of several sequential robot motions which are referenced by a single name. In addition, the low level primitives which move the robot along a path automatically select the closest path entry and exit locations. That makes it possible to use a single path to move efficiently between several different locations.

Paths are defined by an array of up to eight locations. A path is normally traversed from lower numbered locations to higher numbered ones. Each location on a path can be flagged as being an entry point, an exit point, both, or neither. Paths are normally entered only at entry points and left only at exit points. Therefore, each path must have at least one entry point and one exit point. The simplest path consists of a single point, which must be flagged as being both types.

Paths provide a convenient method for moving between groups of locations when the exact destination location is not known until runtime. For example, a path can be defined with an exit point in front of each of several feeders dispensing the same part. Then the path motion primitives allow that single path to be used to move to any of those feeders, even though a specific feeder is not selected until runtime.

Path Entry Low-Level Primitive: "rn.enter.path"

A path is entered by calling the routine "rn.enter.path". This routine scans the path entry points until the closest one is found. For efficiency, the scanning stops when the distances begin to increase. This means that a curved path may be entered at a point earlier than expected.

Once a path is entered, this routine moves the robot along the path until the first exit point is found. The routine returns with the robot moving toward that first exit point.

If a path is defined with only one exit point, "rn.enter.path" is the only path routine required. In that case the other path routines can be ignored.

Path Motion Low-Level Primitive: "rn.move.path"

The path motion routine, "rn.move.path", is called to move along a path toward the first of a group of final destinations. It is called only after the path entry routine has been called successfully.

If there is only one final destination location, the path exit routine "rn.ext.path" (discussed below) should be called instead of "rn.move.path".

While the robot is moving to each path exit point, this routine checks if the following path exit point will be farther away from any of the final destination locations. If so, the current exit point is selected. As with entry points, this means that curved paths may be left earlier than expected.

When this primitive returns control to the calling routine, the robot is left moving toward the selected exit point. In addition, the input parameters are updated so that this routine or the path exit routine can be called to continue moving to a point farther along the path.

A typical use of this routine is to move the robot to the vicinity of a group of part feeders before a specific feeder has been selected for use. The locations of all the feeders would be passed to this routine, and the robot would be moved to the path exit point closest to the first feeder encountered.

Path Exit Low-Level Primitive: "rn.exit.path"

The path exit routine, "rn.exit.path", is called to exit from the path that the robot is currently traversing. This routine has two differences from the routine "rn.move.path":

1. This routine accepts only a single off-path destination location.
2. This routine can move the robot forward or backward along the path to the optimum exit point.

If there is only one exit point defined for a path, this routine need not be called at all since "rn.enter.path" returns with the robot moving toward the first exit point it finds.

This routine is called only after the path entry routine has been called successfully. Given a starting path segment, this routine scans for the exit point which is closest to the specified final destination. It then moves the robot along the path, either forward or backward, until it reaches the selected exit point.

While scanning the exit points, this routine checks if the following path location is farther away from the final destination location. If so, the current exit point is selected. As with entry points, this means that curved paths may be left earlier than expected.

When this primitive returns control to the calling routine, the robot is left moving toward the selected exit point. In addition, the input parameters are updated so that this routine can be called again to continue moving to a different point on the path.

Continuing the example in the previous section: Once a specific part feeder is selected, this routine could be used to move the robot along the original path to the best exit point for that feeder. Or, if a second feeder needs to be accessed, the path could be reentered (see below) and this routine could be used to move the robot forward or backward toward the new feeder.

Path Reentry Low-Level Primitive

The path reentry routine, "rn.reenter.path", is called to return to a path which has been exited. It is called only after the path entry routine has been previously called successfully. This routine moves the robot to the exit point which was selected by a previous call to "rn.enter.path", "rn.move.path", or "rn.exit.path".

When this primitive returns control to the calling routine, the robot is left moving toward the specified path point. In addition, the input parameters are updated so that the path motion or path exit routines can be called again to move to a different point on the path.

Operator Interface Low-Level Primitives

All the runtime routines communicate with the operator interface task by using the primitive routines "rn.message" and "rn.error". These routines conditionally send messages to the operator and the system's "data logger". In addition, "rn.error" waits for an operator response.

Informative and trace messages are both handled by the routine "rn.message". During walk-through training, both types of messages are sent to the operator's terminal. Both types of messages are suppressed from the operator during normal execution.

In either mode, informative messages (but not trace messages) are sent to the data logger.

The routine "rn.error" handles error messages, edit requests, and pause messages. In addition to displaying a message, this routine waits for an operator response to be entered. The response is returned as the status value from the routine. See the description of operator error response codes in the "General Concepts", above, for details.

The database information determines the data which is edited if a database is specified and the operator selects "Edit data" on the STATUS AND EXECUTION CONTROL menu page. "Edit data" has no function if no database is specified.

All pause and error messages are displayed at the operator terminal, but only error messages are sent to the data logger.

Actions

The definition of an action is somewhat arbitrary. It is a series of operations and robot motions which are logically grouped for execution, retrying, or skipping. The intent is to give the operator a level of "coarseness" for single stepping—somewhere between "pause at end of motion" and "pause at end of statement".

"Pause at end of action" is indicated by the control switch "cv.stp.action" being set TRUE. Pausing occurs only if there is no other pending operator error response. Also the new operator response is processed as if it were the current status. For efficiency, the following program sequence is used;

```
CALL any.routine(. . . , error)
IF cv.stp.action THEN
   IF NOT error THEN
      CALL rn.error(error type, error)
   END
END
IF error THEN
   ; Handle error
END
```

The high-level primitives check for "pause at end of action" after they have completed their operation, but before they exit.

Walk-Through Training

Walk-through training mode is indicated by the runtime global variable "rn.sw.walk" being set to TRUE. This switch is set by the menu routines according to the "Walk thru" switch on the WALK-THROUGH TRAINING STATUS AND EXECUTION CONTROL menu page (Table 48). When this switch is set, the runtime system generates trace messages on the status display and allows interactive training of selected data.

Trace messages are generated by calling the message routine "rn.message" with a trace message code. Trace messages normally indicate the start of a new action. They are used sparingly to avoid flooding the operator with messages. Trace calls are typically conditioned on "rn.sw.walk", so that the trace message will be generated only during walk through training:

```
IF rn.sw.walk THEN
    CALL rn.message(message identifier)
END
```

All interactive walk-through training code is conditioned on "rn.sw.walk" so that the program will be as efficient as possible when this switch is not set. This means that during normal operation many error conditions will result in failure of the statement rather than a user-friendly prompt message. If the training mode switch is set, then execution is assumed to be not time critical, and the extra code required to recover from errors in a user friendly manner is permitted.

For most applications, the system customizer can merely call low-level primitives which already handle walk-through training. If walk-through training must be serviced directly, the following general algorithm should be used:

1. The desired operation is attempted, and the status return "error" is saved.
2. If in walk-through mode, or an error status is returned, special code is executed. The IF statement is written to be most efficient during the most common case: non-walk-through mode with no errors.
3. If in walk-through mode, report the error. If there is no error, or the error is "no data defined", prompt the operator to train the data and wait for a response.
4. If not in walk-through mode, report the error and return any operator response code other than "proceed".
5. Perform the operation again to obtain the desired data.
6. Continue this process until the operator either defines the data or responds with a command other than "Proceed".

Alternate Embodiments

As will be understood by those skilled in the art, the present invention can be used for a wide range of robotic assembly tasks. Even the preferred embodiment, which is set up primarily for printed circuit board assembly, could be used for a much broader set of assembly operations if new strategy routines were added to perform additional types of mechanical tasks, such as inserting a threaded part into a threaded housing and bending and shaping parts. For some mechanical operations new data base fields would be needed to specify parametric values so that each primitive and strategy routine can be used on a number of similar parts.

The present invention can also be used for robotic tasks which vary in accordance with feeback signals, including tasks which repeat until a predefined signal or set of signals indicates that the tasks have been completed. While the scheduler routine would have to be somewhat different that the one in the preferred embodiment (e.g., to provide for repeating one or more statements until a specified signal reaches a specified value), the basic concept of using a set of related databases to specify the tasks to be performed, the relevant locations, the motion parameters, and the strategy routines to be used, is unchanged. In this way, the robot's operation can be changed, and the robot system can be set up to perform a new set of tasks, merely by modifying or adding to the data in the databases—i.e., without having to write new software.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

APPENDIX 1

PSEUDOCODE FOR MENU SCHEDULER

```
; The runtime scheduler contains application-specific routines for
; determining the order of statement execution, and for cycling the
; conveyor belts.

; GLOBAL ENTRY POINTS:

;    mu.sched    Start scheduler
;    rn.sched    Execute statements.

.PROGRAM mu.sched($err)

; This routine is spawned by the menu driver to initiate
```

; execution of an assembly sequence.

```
IF (the robot is already running) THEN
    Display message: "Sequence already executing"
    $err = "Sequence already executing"
    GOTO 100                           ; exit immediately.
END
```

; Select the sequence to execute and
;     save the sequence database number in rn.sq.db
;     save the database name in cs.sequence.
; Then put the assembly database number in rn.as.db and
; put the assembly database name in cs.assembly.

```
CALL ld.select                 ; routine for prompting operator
                               ; to select sequence
```

; Exit if no sequence selected
IF (no sequence was selected) GOTO 100
; Link the sequence and all associated databases. That is, for each
; database which includes records that refer to records in another
; database, store the record number of the referenced record in the
; field following the reference. See items in square brackets "[]" in
; the database descriptions.

```
    CALL lk.link.seq(rn.sq.db, warning, error)
    IF warning OR error THEN
        CALL io.prompt("Press RETURN to continue")
        IF error GOTO 100              ; exit if error
    END
```

; Set default values for the loop and step control variables.

```
    cv.completed = 0         ;Number of completed loops
    cv.c.step    = 1         ;First step to execute
    cv.f.step    = final step specified in sequence db
```

; Start specified sequence

Spawn the execution start menu page

100    RETURN
.END

APPENDIX 2

PSEUDOCODE FOR RUNTIME SCHEDULER

.PROGRAM rn.sched()

;   This routine is the main loop for the runtime system.
;   The routine mu.sched sets up global variables for this routine.

;   The following global variables determine which sequence and
;   assembly have been selected:

;           rn.sq.db    Data base number for current sequence
;           rn.as.db    Data base number for current assembly positions ;   The following global variables control the execution:

;           ai.stop.prog        TRUE if system stopping
;           rn.sched.act        TRUE if scheduler active ;           cv.c.step           Number of next step to be executed
;           cv.f.step           Number of final step to be excuted
;           cv.completed        Count of loops completed
;           cv.loop.cnt         Total number of loops to be executed
;           cv.speed            Default robot speed ; Wait for the scheduler to be activated WHILE NOT rn.sched.act DO
        CALL rn.wait.idle(error)
        IF error GOTO 101
    END ; Starting message CALL rn.message("starting assembly")
; Wait for startup if walk-through

```
        IF (in walk-through mode) THEN
            Wait Until Startup
        END ; Initialize CALL rn.sched.init()        ;Initialize runtime
        step = cv.c.step            ;Get next step to execute
        SPEED = cv.speed ; Begin execution IF step ≠ 1 GOTO 20         ;   Not starting at the first step ; Loop for multiple assemblies WHILE (cv.loop.cnt ≠ 0 AND (cv.completed < cv.loop.cnt) DO ; Get new assembly 10          step = 1                ;Getting assembly, set step 1
            cv.c.step = step        ;Save current step number Bring new assembly into the workcell IF error THEN
                IF (error requires retry)    Goto 10
                IF (error requires rejection of assembly) Goto 50
                IF (error requires skipping to next statement) Goto 25
                IF (error requires aborting process)  Goto 100
            END
    ; Loop for assembly sequence 20      WHILE step ≤ cv.f.step DO Set system reference frame to specified reference frame Get the statement for current step
            $statement = statement primitive for this step
            args[] = parameters for this statement in sequence
```

```
         CALL $statement(args[],error)          ; See example in Appendix 3

; Check for pause at end of statement cv.stp.Sfin
25       IF (pause_stm AND  NOT error) THEN
                d
              ;rn.error sends a message and waits for a response
              Call rn.error("Proceed to next statement?", error)

;error = operator's response
              IF (error requires aborting entire process) Goto 100
         END ; Handle any errors in statement 29       IF error THEN
              IF (error requires restarting step) GOTO 20
              IF (error requires skipping to next assembly) GOTO 50
              IF (error requires aborting entire process) Goto 100
         END
              ; if error permits going onto next statement ...
; Go onto next statement step = next step number   ; Get next step number
              cv.c.step = step END                                ; End of sequence ; Assembly sequence complete without error 40       cv.completed = cv.completed + 1

Move complete assembly to complete product destination

IF error THEN.
              IF (error requires retrying action) GOTO 40
              IF (error requires rejection of assembly) GOTO 50
              IF (error requires aborting process)  GOTO 100
         END Call rn.message("ending assembly")
```

```
        GOTO 60

; Assembly sequence complete with error, reject

50      Move assembly to rejected product destination

IF error THEN
            IF (error requires retrying action) GOTO 50
            IF (error requires rejection of assembly) GOTO 50
            IF (error requires aborting process)  GOTO 100
        END
; Exit if no more assemblies or stop at end of sequence 60      If (rn.stp.seq AND  NOT error) THEN
            Call rn.error("pausing at end of sequence", error)
            If (error requires rejection of assembly) GOTO 50
            If (error requires aborting process) GOTO 100
        END END                 ; End of main loop ; All done, exit 100 Display AllDone Message
101 rn.sched.act = FALSE        ; Flag sched not active
    RETURN

.END
```

APPENDIX 3

PSEUDOCODE FOR TRANSFER ROUTINE

```
.PROGRAM transfer(args[], error)

; ABSTRACT:  Transfer statement execution routine.  This routine is called
;    to execute a TRANSFER statement.  It acquires a part from a feeder,
;    moves it along a specified path, and inserts it into an assembly.
;
; Syntax:
;
```

```
;    TRANSFER (APPROACH path) PART part (ALONG path) TO board
;            (DEPART path) (USING tool) (REJECT path)
;
;    Argument type definitions:
;
;    Argument          Type or Database     Misc        formal parameter name
;
;    approach path     PATH                 optional    args[1]
;    part              PART                             args[2]
;    along path        PATH                 optional    args[3]
;    assembly pos      ASSEMBLY                         args[4]
;    depart path       PATH                 optional    args[5]
;    tool              TOOL                 optional    args[6]
;    reject path       PATH                 optional    args[7]
;
; INPUT PARM:   args[]    Array of arguments (record numbers or constants)
;
; OUTPUT PARM: error
;
; Define argument offsets
        app.path.arg = 1
        part.arg = 2
        alo.path.arg = 3
        board.arg = 4
        dep.path.arg = 5
        tool.arg = 6
        rej.arg = 7

Open part database at record=args[part.arg]
    IF error GOTO 100 parttype = part type specified in part record

Open parttype database at record=parttype
    IF error GOTO 100

; Open assembly position

Open assembly database at record=args[board.arg]
    IF error GOTO 100
```

; Acquire part

```
    CALL rn.acquire(args[part.arg], args[tool.arg], args[app.path.arg], error)
    IF error GOTO 100
```

; Insert part, handle optional paths

```
    CALL rn.insert(args[alo.path.arg], args[dep.path.arg], args[rej.arg], error)

100 RETURN

.END
```

APPENDIX 4

PSEUDOCODE FOR ACQUIRE ROUTINE

```
.PROGRAM rn.acquire(part, ns.tool, path, error)

; ABSTRACT:  Primitive routine to handle acquiring a part from a feeder.
;
;       1.   If this part requires a different tool transform, set it.
;       2.   If there is path specified, move along it.
;       3.   Scan feeders looking for one which is enabled and ready.
;            All feeders are scanned, beginning with the last successful
;            one, continuing in a circular fashion until it is reached
;            again.
;       4.   If found, the associated feeder routine is called.
;            If it succeeds, the identity of the feeder is saved,
;            the time of use is stored, and this routine is done.
;       5.   Otherwise the rest of the feeders are scanned.
;       6.   If no feeder is ready or enabled, all feeders are scanned
;            until the maximum feeder timeout is exceeded, in which
;            case an error is generated.
;
; INPUT PARM:  part = record number of currently open part.
;            ns.tool = record number of optional non-standard tool.
;                  Zero if none.
;            path = record number of optional feeder approach path.
;                  Zero if none.
;
```

```
;   OUTPUT PARM:  If no error,
;                    error = rn.opr.success,
;                    The feeder accessed is left open as the current record.
;             Otherwise,
;                    error = Standard operator error response code.
;
;   MISC.:  The following databases are assumed to be open with the
;        current record selected for the statement being processed:
;
;             part
;             parttype If (in walk through mode) Call rn.message("part being acquired")

app.path = path                  ;Save approach flag

; See if different tool.  If so, change it.

10     CALL rn.update.tool(ns.tool, 1, error)
       IF error GOTO 99

; Enter path if specified.

IF app.path THEN
             Open Path database and point to app.path record

Enter path at closest entry point
             path.index = first exit point on path after selected entry point
             path.feeder.1 = path.index    ;Save index for first exit point
             app.path = FALSE              ;Do not approach again
       END ; Get acquire routine ptr $rtn = routine identified in acquire field of part type record in open
             parttype db ; Find the first feeder and open it feeder.link[] = array of feeder record numbers specified part record
```

```
20   IF ( feeder.last.used[part] is undefined ) THEN
         first.feeder = 0                 ; No last feeder, start with first
     ELSE
         first.feeder = feeder.last.used[part]   ;Try last feeder again
     END feeder.index = first.feeder        ;Start with first DO
         feeder = feeder.link[feeder.index] ;Fetch feeder record number IF feeder THEN              ;Found feeder, process it
            feeder.num = -1
            time = timer(0)          ;Save current time
            wait.time = time         ;Initialize wait time
            GOTO 25                  ;Enter enabled feeder search loop
         END feeder.index = feeder.index+1
         IF (feeder.index ≥  size of feeder array in part record) THEN
            feeder.index = 0    ;Wrap around
         END
     UNTIL feeder.index = first.feeder ; No feeders defined if we reach here CALL error("No feeders defined for", part)
     GOTO 90                         ;Fatal error ; Loop to search for enabled feeder which is ready or has completed cycle
; Keep track of maximum cycle time left and count number possible

25   DO

; Open the feeder record and read feeder parameters

Open feeder database at record = feeder
     feed.time = cycle time field in feeder record
     max.time  = maximum time field in feeder record
```

; Compute max timeout for this feeder

IF ( rn.fd.time[feeder] is undefined ) rn.fd.time[feeder] = time

IF max.time + rn.fd.time[feeder] > wait.time THEN
      wait.time = max.time + rn.fd.time[feeder]
    END ; Get transit or approach point for any enabled feeder IF (this feeder is enabled,
        i.e., the signal identified by the "enable signal" field is on) THEN feeder.num = feeder.num+1    ;Count this feeder ; If no transit point, use approach point IF (transit location is not specified) THEN
          transit[feeder.num] = FALSE
      ELSE
          transit[feeder.num] = TRUE
      END ; If feeder ready, move along path and call strategy routine IF (ready signal for feeder is on)
        AND (time $\leq$ (rn.fd.time[feeder]+feed.time)) THEN ; Feeder is ready, move to it and call feeder routine IF (in walk through mode) THEN         ;Trace message
            CALL rn.message(identify feeder being called)
          END IF path THEN           ;Move to exit point on path
        Move to exit point on path which is closest to feeder
      END fd.oprs[] = Array of values from feeder record
        ref = reference frame for relative feeder moves
        loc = Part pickup location for this feeder
        mve[] = Motion parameters for this location

```
    IF transit[feeder.num] THEN    ;If transit point defined...

; Move to transit point, fetch approach data
;    call strategy routine, return to transit point Set current reference frame = specified reference frame for feeder CALL move (to specified feeder transit location, using specified
              speed, and specified transit type)

; Call acquire routine specified by parttype
    CALL $rtn(fd.oprs[], ref, loc.rel, mve[], error)

CALL move (to specified feeder transit location, using specified
              speed, and specified transit type)

ELSE           ; No transit point, just call strategy routine

CALL $rtn(fd.oprs[], ref, loc.rel, mve[], error)
    END rn.fd.time[feeder] = timer(0)  ;Save current time ;Check for pause at end of action
                cv. strp. action
    IF (pause.action AND NOT error) THEN ;operator specifies "error" value indicating whether to continue
       CALL rn.error ("Pause at end of feeder action", error)
    END IF NOT error THEN
      rn.pa.feed[part] = feeder.index    ;Save feeder index
      GOTO 100       ;Exit with success
    END IF error ≠ rn.opr.retry GOTO 99

; Retry action.  Setup to move to another feeder

IF path THEN        ;Return to path exit point
            Call Move (back onto path)
          END
```

```
            GOTO 20                    ;Scan all feeders
        END ;IF ready...
      END ;IF enabled...

; Get next feeder

DO
          feeder.index = feeder.index+1
          IF feeder.index ≥ pa.feeder.num THEN
              feeder.index = 0       ;Wrap around
          END
          feeder = feeder.link[feeder.index]   ;Get next rec number
        UNTIL feeder OR (feeder.index = first.feeder)

UNTIL feeder.index = first.feeder  ;Loop until all feeders tried

; Could not find a feeder which is ready, move toward the first enabled one.

IF (feeder.num ≥ 0) AND (timer(0) ≤ wait.time) THEN

; Move toward first enabled feeder

IF path THEN
          CALL Move (on path toward the exit point closest to the feeder)
        END GOTO 20              ;Scan feeders again
    END ; Could not find a feeder enabled CALL rn.error ("could not find an enabled feeder for part", error)
    GOTO 99

; Error accessing data base 90  error = rn.opr.abort              ;Fatal error, abort
99  IF error = rn.opr.retry GOTO 10   ;If retry requested
    IF error = rn.opr.skip THEN       ;Change skip to success
        error = rn.opr.success
    END
```

100 RETURN

.END

APPENDIX 5

PSEUDOCODE FOR ACQUIRE STRATEGY ROUTINE

```
.PROGRAM rn.ac.standard(fd.oprs[], ref, loc, mve[], error)

; ABSTRACT:  Standard part acquisition strategy routine.
;
;    This routine acquires a part from a standard feeder using
;    standard gripper.  The gripper has binary output signals
;    for open and close, and binary input signals for part presence
;    detection.
;
;    Part presence is detected by attempting to grip a part
;    and checking the part presence signal.  If no part is detected,
;    after a number of retries, the alarm is signaled and the feeder
;    disabled.
;
; INPUT PARM.:
;          fd.oprs[] - Array of values from feeder record.
;          ref = reference frame for relative feeder moves.
;          loc = Part pickup location for this feeder.
;          mve[] = Motion parameters for this location
;              If mve[cc.mve.type] = -1, loc and mve[] data
;              are invalid. ;
;          The following records are currently open upon entry:
;              part
;              part type
;              feeder
;
; OUTPUT PARM: error    Standard operator error response code.
;
; MISC: May clear feeder enable
;

; Top of loop for retries of single feeder
```

```
        FOR tries = 0 TO fd.oprs[retry count]

; Verify that part-present signal is on, and open gripper

10      IF (part.present is off) THEN
          CALL rn.error("part present error", error)
          IF error = rn.opr.retry GOTO 10    ;Loop if retry
          IF error GOTO 100                  ;Exit if any others
        END Turn off gripper's close signal
        Turn on  gripper's open  signal ; Get gripper offset values from user parameters in feeder record User[0] = first  user parameter from feeder record
        User[1] = second user parameter from feeder record SET offset = user[0], user[1]

CALL Move (to feeder approach location with offset,
                   i.e., fd.opr[approach] + offset)

; Move to feeder grip point

IF user[0] OR user[1] THEN
          CALL Move (to grip location, i.e., fd.opr[location] + offset)
        END CALL Move (to grip location, i.e., fd.opr[location])

; Activate gripper

CALL rn.break(error)              ; Wait until motion stops

Turn off gripper's open  signal    ;Close gripper
        Turn on  gripper's close signal
        Wait for period = cv.delay.close   ;delay for gripper action ; Set speed used when part is in hand tmp = "speed when holding part" parameter in parttype db
        rn.part.speed = tmp/100            ;Set the motion speed factor
```

; Depart from grip point, force straight-line motion

CALL Move (to depart location specified in feeder record,
                i.e., fd.opr[depart],
                using straight line motion)
        IF error GOTO 100

; Verify that part-present signal is on. If not, retry

IF (part.present signal is on) GOTO 100    ;Part present, success
    END

; No part present after retries exhausted

Turn on alarm signal
    Turn on gripper's open signal
    Turn off gripper's close signal    ;Open Gripper
    Turn off feeder's enable signal CALL message("feeder empty")
    error = rn.opr.retry    ;Request retry of different feeder 100 RETURN        ; Exit
.END

APPENDIX 6

PSEUDOCODE FOR PALLET ACQUIRE STRATEGY ROUTINE

.PROGRAM rn.ac.pallet(fd.oprs[], ref, loc.rel, mve[], error)

; ABSTRACT:  Standard routine to acquire a part from a pallet.
;
;    Individual pallet parameters are specfied in the feeder database.
;    The current part to be acquired from the pallet is specified by
;    the current x and y offsets stored in the feeder database. Once
;    a part is succesfully retrieved from the pallet, the indicies are
;    appropriately incremented.
;

```
;      User feeder parameters 1 and 2, if non-zero, are used as tool
;      coordinates offset values when approaching and moving to the part.
;
; INPUT PARM.:
;           fd.oprs[] = Array of real values for operating the feeder.
;           ref = Reference frame for this pallet.
;           loc.rel = Part pickup location for this feeder, relative to ref.
;           mve[] = Motion parameters for this location
;                If mve[cc.mve.type] = -1, loc and mve[] data
;                are invalid.
;
;           The following records must be open upon entry:
;                part
;                part type
;                feeder
;
; OUTPUT PARM: error     Standard operator error response code.
;
; MISC: May clear feeder enable
;
; Top of loop for retries of single feeder
     Loop FOR tries = 0 TO fd.oprs[retry count]

; Verify that non-zero part-present signal is off and open gripper

10        IF (part.present is off) THEN
               CALL error("part present error", error)
               IF error = rn.opr.retry GOTO 10    ;Loop if retry
               IF error GOTO 100                  ;Exit if any others
          END Turn off gripper's close signal
          Turn on  gripper's open  signal ; Get pallet data from the open feeder record approach   = feeder's approach location
               depart     = feeder's depart   location
               grip.pt    = feeder's "location"
```

```
    p.row.count = pallet row count
    p.col.count = pallet col count p.row.index = pallet row index
    p.col.index = pallet col index p.row.space = pallet row spacing
    p.col.space = pallet col spacing User[0] = first  user parameter from feeder record
    User[1] = second user parameter from feeder record
    Set offset = User[0], User[1]

; Compute pallet part's relative location tmpx = p.row.space * (p.row.index-1)
    tmpy = p.col.space * (p.col.index-1)

; Move to approach location

CALL Move (to approach + tmpx,tmpy + offset,
               i.e., computed approach location)

; Move to grip point
; If offset values specified, use them for extra move

IF user[0] OR user[1] THEN
      CALL Move (to grip.pt + tmpx,tmpy + offset,
                 i.e., computed grip pt location)
    END CALL Move (to grip.pt + tmpx,tmpy)

IF error GOTO 100

; Activate gripper

CALL rn.break                  ;wait until motion stops

Turn off gripper's open  signal
```

```
        Turn on  gripper's close signal         ;Close gripper

Wait for period = cv.delay.close        ;delay for gripper action

; Set speed used when part is in hand tmp = "speed when holding part" parameter in parttype db
        rn.part.speed = tmp/100        ;Set the motion speed factor ; Depart from grip point, force straight-line motion CALL Move (to depart + tmpx,tmpy,
                   using straight line motion)
        IF error GOTO 100

; Verify that part-present signal is on.  If not, loop

IF (part.present signal if on) GOTO 91  ;Part present, exit loop
    END                                         ; end of loop ; No part present after retries exhausted 90  error = rn.opr.retry                ;Request retry
    Turn on gripper's open signal
    Turn off gripper's close signal     ;Open Gripper ; Increment index. Signal alarm if pallet empty, even if got part 91  CALL rn.update.index(tmpx, tmpy, empty, error)
                                    ;updates row and col index,
                                    ;put error signal in error
                                    ;put pallet empty signal in empty IF error GOTO 100

; Signal and disable if pallet is empty

IF empty THEN                       ;If pallet is empty
        Turn on alarm signal
        Turn off feeder's enable signal
        CALL rn.message("feeder empty")
    END
```

100 RETURN

.END

APPENDIX 7

PSEUDOCODE FOR PART INSERTION ROUTINE

```
.PROGRAM rn.insert(ref, app.path, dep.path, rej.path, error)

; ABSTRACT:  Primitive routine to handle inserting a part into an
;     assembly position.
;
;     Handles rn.opr.retry and rn.opr.skip.
;
; INPUT PARM:  ref = reference frame for relative moves.
;         app.path = logical record number of optional approach
;              path, zero if none.
;         dep.path = logical record number of optional depart
;              path, zero if none.
;         rej.path = logical record number of optional reject
;              path, zero if none.
;
;         Assumes the following data bases are open:
;              assembly position
;              part
;              part type
;
; OUTPUT PARM: error    Standard operator error response code.
;
; SIDE EFFECTS: Changes current record for path db.
;
    IF (in walk through mode)  CALL rn.message("part insertion")

Set current reference frame = ref do.path = app.path       ;Copy approach path record ; Process optional approach path
```

```
10    IF do.path THEN

Call Enter (do.path at closest entry point, and start robot
                     moving toward first exit point)

CALL Move (along do.path to exit point closest to specified
                    assembly location)

do.path = FALSE        ;Don't retry path again
    END

; Approach location

CALL move (to approach location specified in assembly db)

; Get insert routine $rtn = insert routine specified in parttype db ref   = reference frame for relative moves
    loc   = Absolute location for the current assembly position
    mve[] = Motion args for this assembly position ; Call the user-specified routine CALLS $rtn(ref, loc, mve[], error)

; If no error, check for stop at end of action cv.stp.
    IF (pause.action AND NOT error) THEN    ;Check for pause at end of action
         ;operator specifies "error" value indicating whether to continue
         CALL rn.error ("pause at end of action", error)
    END ;If insertion succeeds, global value cv.ins.success is set to TRUE
;Reject part if failure IF NOT (cv.ins.success) THEN
              IF rej.path AND ((error = rn.opr.fail) OR NOT error) THEN
                   errsav = error
```

```
        CALL rn.message("part insertion failure")

CALL rn.reject(rej.path, error)         ; See Appendix 9

IF NOT error THEN
            error = errsav
        END
        GOTO 90
    END.

IF error = rn.opr.abort GOTO 90

CALL rn.error("part insertion failure", error)
        IF error  GOTO 90
                                                ;error = operator's response
    END ; Follow depart path if no error IF dep.path AND NOT error THEN      ;Process optional depart path
        CALL Enter (dep.path at closest entry point, and start robot
                    moving toward first exit point)
    END ; Handle errors 90  IF error = rn.opr.retry GOTO 10    ;Handle retry
    rn.part.speed = 1                  ;Part not in hand, reset speed

RETURN
.END
```

APPENDIX 8

PSEUDOCODE FOR PART INSERTION STRATEGY ROUTINE

```
.PROGRAM rn.in.standard(ref, loc, mve[], error)

; ABSTRACT:  Standard part insertion strategy routine.
;
;   This routine handles an optional part present sensor and
```

```
;    part jammed force sensor.  Non-zero sensor signals indicate
;    that the sensor is present and should be used.
;
;    If a part jam is detected, a simple spiral search is used to
;    retry the motion.  If the retry limit is reached, and a reject
;    path is specified, the part is rejected.  Otherwise an operator
;    error is generated.
;
;    If the part is inserted after a search, the board location
;    is updated if the global variable cu.update.ins is TRUE.
;
; INPUT PARM:  ref = reference frame for relative moves.
;         loc = Absolute location for the current assembly
;               position returned from the approach routine.
;         mve[] = Motion args for this assembly position returned
;               by approach routine.
;
; OUTPUT PARM: error    Standard operator error response code.
;              Error rn.opr.next indicates that the insertion
;              failed and the part was rejected.
;         loc = Updated if search attempted.
;         mve[] = Possibly updated if training.
;
; SIDE EFFECTS:    If insertion succeeds, global value
;         cv.ins.success is set to TRUE, otherwise unchanged.
;
10      modify = FALSE           ;Assume no modification ; Verify that part-present signal is on.  If not, restart statement IF NOT (part.present) THEN
            CALL rn.error("No part present")
            GOTO 90
        END ; Verify that optional part-jam sensor is off IF (part.jammed) THEN
            CALL rn.error("part jammed sensor signal is on", error)
            IF error GOTO 90              ;Exit if jam not fixed
        END
```

; Perform guarded move, monitoring jam sensor
;   Note that single step is not allowed for a guarded move since it will
;   prevent the subsequent monitoring loop from being executed.

```
    rn.move.sstep = FALSE           ;Disable single step
    CALL Move (to specified assembly location, error)
    rn.move.sstep = TRUE            ;Enable single step
    IF error GOTO 90

IF (part jam sensor enabled) THEN      ;If sensor, monitor it

WAIT until (robot motion stops OR part.jammed)

IF (part.jammed) THEN
          BRAKE                     ;Stop robot immediately if jammed
          CALL rn.break(error)      ;Wait for motion to end, check errors
          IF error GOTO 90

; Perform search operation
          CALL rn.search(ref, loc, mve[], error) ; See Appendix 11
          IF error GOTO 90
          modify = TRUE             ;Indicate location modified
        END
    END
```

; Insert successful

```
    CALL rn.break(error)      ;Wait for motion to end, check errors
    IF error GOTO 90

Turn off gripper's close signal
    Turn on  gripper's open  signal         ;Open standard gripper cv.ins.success = TRUE           ;Flag insert successful
    rn.part.speed = 1               ;reset to nominal speed Wait for period = cv.delay.open ;delay for gripper action
```

; If location modified by search, check about update
; Compute how the insert location has changed, apply that change
; to the board location.

; If in walk-through mode, the entire change is applied. Otherwise,
; the fraction of the change indicated by cu.scale.ins is applied.

```
    IF modify THEN

IF (assembly location updating is enabled AND NOT error) THEN
         IF (in walk through mode) THEN
            CALL rn.error("assembly location update okay?", error)
             ; operator's answer: yes(0), skip, or abort
            IF error = rn.opr.skip THEN
              error = rn.opr.success   ;Map skip to success
             GOTO 85
            END IF error GOTO 100
            new.loc = location found by search
        ELSE
            IF NOT cu.scale.ins GOTO 85    ;Check for automatic update
            loc = prior assembly location
            new.loc = loc + (location found by search - loc) * cu.scale.ins
        END store new.loc in assembly database
        END
85  END ; Depart from grip point 90  IF (NOT error) OR (error = rn.opr.fail) THEN
        CALL Move (to specified depart location, error)
    END 100 IF error = rn.opr.retry GOTO 10        ;Loop if retry

RETURN

.END
```

APPENDIX 9

PSEUDOCODE FOR PART REJECTION ROUTINE

```
.PROGRAM rn.reject(path, error)

; ABSTRACT:  Primitive routine to reject a part.
;    The algorithm is as follows:
;
;    If a path is specified (path ≠ 0) then
;         1. Enter path and move to the first exit point.
;         2. Call the user reject strategy routine
;         3. Move to the next exit point.
;    Else ignore path, and exit
;
; INPUT PARM:  path = Record number of optional reject path.
;              If zero, no reject is performed.
;
;         Assumes the following data bases are open to the correct
;         record:
;              part
;              part type
;
;
; OUTPUT PARM: error    Standard operator error response code.
;
; SIDE EFFECTS: May open a path record.
;
; If a path is defined, enter path, move to first exit point IF path THEN
          CALL rn.message(part.name, "being rejected")

Open record for path

CALL Enter(path at closest entry point and move toward first exit pt)
; Get strategy routine $rtn = rejection strategy routine specified in parttype record
```

```
        CALLS $rtn(error)      ;   Call the user-specified routine
        IF error GOTO 100

; Continue along path to next exit point

CALL Exit (exit path at second exit point)
        IF error GOTO 100

IF pause_action THEN            ;Check for pause at end of action
                                        ;operator specifies "error" value
                                        ;indicating whether to continue
          CALL rn.error ("Pause: part rejected. Continue?", error)
        END
      END

100 RETURN

.END
```

(handwritten annotation above "pause_action": *at stp.action*)

APPENDIX 10

PSEUDOCODE FOR PART REJECTION STRATEGY ROUTINE

```
.PROGRAM rn.rj.standard(error)

; ABSTRACT:  Standard part reject strategy routine.
;
;   This routine rejects part held by a standard gripper.
;   The gripper has binary output signals for open and close,
;   and binary input signals for part presence detection.
;
; INPUT PARM.: None.
;
;       The following database are open upon entry
;           part
;           part type
;           board location
;
; OUTPUT PARM: error    Standard operator error response code.
;              rn.opr.retry is handled internal to this routine.
```

```
10   CALL rn.break(error)      ;Wait for motion to end, check errors
     IF error GOTO 100

Turn off gripper's close signal    ;Open gripper
     Turn on  gripper's open  signal
     Wait for time = cv.delay.open      ;Wait for gripper action ; Verify that part-present signal is off IF (part.present) CALL rn.error("unable to reject part", error)

100  IF error = rn.opr.retry GOTO 10    ;Loop if retry
     RETURN
.END
```

APPENDIX 11

PSEUDOCODE FOR PART INSERTION SEARCH ROUTINE

```
.PROGRAM rn.search(ref, loc, mve[], error)

; ABSTRACT:  This routine performs a "square spiral" search
;     during insertion.  It assumes that a compliant force
;     sensor is on the gripper with its status indicated
;     by the "part-jammed" signal line.
;
;   The search pattern is:
;
;            20  19  18  17  16
;
;            21   6   5   4  15
;
;            22   7   0   3  14
;
;            23   8   1   2  13
;
;            24   9  10  11  12
;
;            25  etc...
;
```

```
;     If successful, the part is inserted.  The actual location
;     may be shifted in the X or Y direction.
;
; INPUT PARM:  ref = reference frame for relative moves.
;              loc = Absolute location which is the goal for the
;                    current insert which has jammed.
;              mve[] = Motion control args for this assembly position.
;
; OUTPUT PARM:
;              If search fails
;                    error = Standard operator error response code.
;                    loc = Updated for last insertion attempt
;              If search succeeds,
;                    error = rn.opr.success
;                    loc = Updated for actual insertion position.

; Get search parameters from part type record step.x    = search step along x
      step.y    = search step along y
      step.r    = search step about z     ; rotation max.x     = maximum search in x direction
      max.y     = maximum search in y direction
      max.r     = maximum search in z direction depart    = depart distance during search ; Compute maximum number of loops loops = INT( ABS( max.x / step.x) + .5))

c = INT( ABS( max.y / step.y + .5 ))
      IF c > loops  THEN
            loops = c
      END ; Perform square spiral scan SET newloc = loc            ;Start at the current location
```

```
    FOR c = 1 TO loops

; Scan right along bottom row        ; See Appendix 12

FOR i = 1-c TO c
           CALL rn.do.search(i, -c, loc, mve[], max[], step[], newloc, error)
            IF error ≠ rn.opr.fail GOTO 90
         END ; Scan up along right column FOR i = 1-c TO c
           CALL rn.do.search(c, i, loc, mve[], max[], step[], newloc, error)
           IF error ≠ rn.opr.fail GOTO 90
         END ; Scan left along top row FOR i = c-1 TO -c STEP -1
           CALL rn.do.search(i, c, loc, mve[], max[], step[], newloc, error)
           IF error ≠ rn.opr.fail GOTO 90
         END ; Scan down along left column FOR i = c-1 TO -c STEP -1
           CALL rn.do.search(-c, i, loc, mve[], max[], step[], newloc, error)
           IF error ≠ rn.opr.fail GOTO 90
         END

END error = rn.opr.fail

; Return new location

90  SET loc = newloc          ; return new location

100 RETURN

.END
```

APPENDIX 12

PSEUDOCODE FOR DO.SEARCH ROUTINE

```
.PROGRAM rn.do.search(row, col, loc, mve[], max[], step[], newloc, error)

; ABSTRACT:  Local routine used by rn.search.  It moves the robot during
;    a search operation.  It moves to a location determined by
;    the current row and col and the various search parameters.
;
;    Straight-line/joint-interpolated is determined by the setting
;    of the configuration switch ai.sl.dep.
;
; INPUT PARM.: row = Integer row number (+/- loop count)
;       col = Integer column number (+/- loop count)
;       loc = Absolute location which is the goal for the
;             current insert which has jammed.
;       mve[] = Motion control args for this assembly position.
;       max[], step[] = Array of search arguments
;       newloc = Position of last attempted insertion
;
; OUTPUT PARM:
;       If search fails,
;           error = Standard operator error response code.
;           newloc = Position of last insertion attempted
;       If search succeeds,
;           error = rn.opr.success
;           newloc = Position of actual insertion
;

; Loop for possbile rotations

FOR rot = -max.r TO max.r STEP step.r

; Lift gripper
    SPEED = depart.speed/100         ; use depart speed
    CALL Move (to approach height above newloc)

; Compute next position to try x = row*step.x
```

```
    y = col*step.y
    IF ABS(x) > max.x THEN
      x = SIGN(x)*max.x
    END IF ABS(y) > max.y THEN
      y = SIGN(y)*max.y
    END newloc = loc + TRANS(x, y, 0, 0, 0, rot)
    SPEED = depart.speed/100        ; use depart speed
    CALL Move(to approach height above newloc)

; Perform guarded move, monitoring jam sensor
;   Note that single step is not allowed for a guarded move since it
;   will prevent the subsequent monitoring loop from being executed.

SPEED = approach speed/100 rn.move.sstep = FALSE      ;Disable single step
    CALL Move (to newloc)      ;attempt insertion
    rn.move.sstep = TRUE       ;Enable single step
    IF error GOTO 100

WAIT until (robot motion stops OR part.jammed)
        IF (part.jammed) THEN
          BRAKE                    ;Stop immediately if jammed
          CALL rn.break(error)     ;Wait for motion to end, check errors
          IF error GOTO 100
        ELSE
          CALL rn.break(error)     ;Wait for motion to end, check errors
          GOTO 100                 ;Exit
        END IF step.r = 0 GOTO 99      ;Exit with failure
    END 99  error = rn.opr.fail            ;Insert failed

100 RETURN

.END
```

What is claimed is:

1. A robotic assembly system, comprising:
   a moveable member for moving specified objects from specified source locations to specified destinations within a specified workcell; and
   a controller, coupled to said moveable member, for controlling the movement of said moveable member, including:
   a set of primitive routines for controlling the operation of said moveable member while performing predefined tasks in accordance with specified parameters;
   a set of separate, interrelated data structures for storing data defining a robotic assembly sequence by separately denoting the tasks to be performed, data defining the relative positions of the set of locations which define said workcell, and data defining how each said task is to be performed, said data structures including:
   at least one location database for defining the locations to be used in said assembly sequence, including means for storing parameter values, for each of at least a multiplicity of said locations, which govern how said moveable member moves when moving to each said location;
   at least one part database for defining the objects to be moved by said system, including means for storing data defining for each said object at least one potential source location, and at least one parameter which specifies one of said primitive routines for use when moving said object; and
   at least one sequence database for specifying the sequence of tasks to be performed in said assembly sequence, including a multiplicity of records, each record storing data specifiying an object in said part database, and a location in said location database to which said object is to be moved; and
   movement directing means, coupled to said primitive routines and said interrelated data structures, for reading the data stored in said location, part and sequence databases and for executing said primitive routines in a sequence and using parameters specified in corresponding ones of said databases;
   whereby the data in said databases collectively specify the operation of said moveable member.

2. The system of claim 1, wherein
   said data structures include a specified sequence database with a multiplicity or records; and
   said robotic assembly sequence is specified by a set of tasks level statements, each task level statement specifying a set of robotic operations which together comprise a predefined type of robotic task; each said task level statement being represented by a separate record in said specified sequence database, each said record including means for referencing parameter values, stored in other ones of said data structures, to be used when performing each of said robotic operations.

3. The system of claim 1, wherein
   said location databases include an assembly database for defining a multiplicity of destination locations for said assembly sequence, including means for defining movement parameters for each said destination location to control how said moveable member moves when approaching said destination location;
   said primitive routines include at least one movement routine which controls how said moveable member moves in accordance with said movement parameters.

4. The system of claim 3, wherein
   said movement parameters include a speed parameter which corresponds to the speed at which said moveable member is to move when approaching said destination location.

5. The system of claim 3, wherein
   said assembly database includes means for defining an approach location for each said destination location, said approach location comprising a position which said moveable member is to move through when approaching said destination location.

6. The system of claim 1, wherein said system includes
   a plurality of part feeders for supply parts to be moved by said robotic system, each said feeder including means for generating an ready signal indicating that said feeder is ready to supply a part; and
   a feeder database for defining the characteristics of said feeders, including means for denoting for each said feeder the location of said feeder and the identity of said feeder's ready signal;
   said part database including means for denoting for each said object, a pointer to the information in said feeder database for at least one corresponding part feeder.

7. The system of claim 1, wherein
   said objects are classified into a plurality of part types;
   said part database includes parttype denoting means for denoting for each said object, the part type corresponding to said part;
   said system includes a part type database for denoting for each said part type which ones of said primitive routines are to be used when moving parts denoted in said part database as being of said part type.

8. A method of programming a robotic assembly system to perform an assembly sequence, said robotic assembly system having a moveable member for moving specified objects from specified source locations to specified destinations within a specified workcell, the steps of the method comprising:
   providing a set of primitive routines for controlling the operation of said moveable member while performing predefined tasks in accordance with specified parameters;
   providing a set of separate, interrelated data structures for storing data defining a robotic assembly sequence by separately denoting the tasks to be performed, data defining the relative positions of the set of locations which define said workcell, and data defining how each said task is to be performed, said data structures including:
   at least one location database for defining the locations to be used in said assembly sequence, including means for storing parameter values, for each of at least a multiplicity of said locations, which govern how said moveable member moves when moving to each said location;
   at least one part database for defining the objects to be moved by said system, including means for storing data defining for each said object at least one potential source location, and at least one parameter which specifies one of said primitive routines for use when moving said object; and
   at least one sequence database for specifying the sequence of tasks to be performed in said assembly sequence, including a multiplicity of records, each record storing data specifying an object in said part database, and a location in said location database to which said object is to be moved; and executing said primitive routines in a sequence and using parameters specified in corresponding ones of said databases;

whereby the data in said databases collectively specify the operation of said moveable member.

9. The method of claim 8, wherein said data structures include a specified sequence database with a multiplicity or records; and said assembly sequence is specified by a set of tasks level statements, each task level statement specifying a set of robotic operations which together comprise a predefined type of robotic task; each said task level statement being represented by a separate record in said specified sequence database, each said record including means for referencing parameter values, stored in other ones of said data structures to be used when performing each of said robotic operations.

10. The method of claim 8, wherein said location databases include an assembly database for defining a multiplicity of destination locations for said assembly sequence, including means for defining movement parameters for each said destination location to control how said moveable member moves when approaching said destination location;

said primitive routines include at least one movement routine which controls how said moveable member moves in accordance with said movement parameters.

11. The method of claim 10, wherein said movement parameters include a speed parameter which corresponds to the speed at which said moveable member is to move when approaching said destination location.

12. The method of claim 10, wherein said assembly database includes means for defining an approach location for each said destination location, said approach location comprising a position which said moveable member is to move through when approaching said destination location.

13. The method of claim 8, further including the step of modifying a specified aspect of a specified assembly sequence to be performed by said robotic assembly system by modifying and/or adding the data stored in corresponding ones of said interrelated data structures;

whereby an assembly sequence can be specified and modified by storing corresponding data values in said interrelated data bases; the same said set of primitive routines being usable for a wide variety of specified assembly sequences.

14. The method of claim 8, wherein an assembly task can be partially specified by storing in said interrelated data structures only a portion of the data required to completely specify the assembly task;

said method further including the step of interactively training said robotic assembly system to perform a specified assembly sequence, said interactive training step including the steps of:

executing said primitive routines in the sequence specified in a selected sequence database;

stopping the execution of said primitive routines when the execution of a primitive routine requires a data value which has not been stored in said interrelated data structures;

prompting the operator of said robotic assembly system to enter the data values required to continue performing said specified assembly sequence;

resuming the performance of said specified assembly sequence when said required data values have been entered and stored in said interrelated data structures.

15. The system of claim 1, further including editing means for modifying selected aspects of a specified assembly sequence, including means for modifying and adding to the data stored in said interrelated data structures;

whereby an assembly sequence can be specified and modified by storing corresponding data values in said interrelated data bases; the same said set of primitive routines being usable for a wide variety of specified assembly sequences.

16. The system of claim 1, wherein an assembly task can be partially specified by storing in said interrelated data structures only a portion of the data required to completely specify the assembly task;

said system including walk through training means for interactively training said robotic assembly system to perform a specified assembly sequence, said walk through training means including means for:

executing said primitive routines in the sequence specified in a selected sequence database;

stopping the execution of said primitive routines when the execution of a primitive routine requires a data value which has not been stored in said interrelated data structures;

prompting the operator of said robotic assembly system to enter the data values required to continue performing said specified assembly sequence; and resuming the performance of said specified assembly sequence when said required data values have been entered and stored in said interrelated data structures.

17. A robotic assembly system, comprising:

a moveable member for moving specified objects from specified source locations to specified destinations within a specified workcell;

a set of predefined primitive routines for controlling the operation of said moveable member in accordance with specified parameters;

a set of interrelated databases for storing data defining a robotic assembly sequence, distinct ones of said databases separately storing data denoting a sequence of tasks to be performed by said moveable member, and parameter values for said primitive routines defining how each said task is to be performed;

movement directing means, coupled to said primitive routines and said interrelated databases, for reading the data stored in said interrelated databases and for executing said primitive routines in a sequence and using parameters specified in corresponding ones of said databases;

whereby the data in said databases collectively specify the operation of said moveable member.

18. The system of claim 17, wherein an assembly task can be partially specified by storing in said interrelated databases only a portion of the data required to completely specify the assembly task;

said system including walk through training means for interactively training said robotic assembly system to perform a specified assembly sequence, said walk through training means including means for:

executing said primitive routines in a sequence corresponding to a sequence of tasks denoted by the data stored in said interrelated databases;

stopping the execution of said primitive routines when the execution of a primitive routine requires a data value which has not been stored in said interrelated databases;

prompting the operator of said robotic assembly system to enter the data values required to continue performing said specified assembly sequence; and resuming the performance of said specified assembly sequence when said required data values have been stored in said interrelated databases.

19. The system of claim 17, wherein
said data structures include a specified sequence database with a multiplicity or records; and
said robotic assembly sequence is specified by a set of tasks level statements, each task level statement specifying a set of robotic operations which together comprise a predefined type of robotic task; each said task level statement being represented by a separate record in said specified sequence database, each said record including means for referencing parameter values, stored in other ones of said data structures, to be used when performing each of said robotic operations.

20. A method of defining a robotic assembly sequence to be performed by a robotic assembly system having a moveable member for moving specified objects from specified source locations to specified destinations within a specified workcell, the steps of the method comprising:

providing a predefined set of primitive routines for controlling the operation of said moveable member in accordance with specified parameters;

storing in a set of separate, interrelated databases, data denoting a sequence of assembly tasks and parameter values defining how each said task is to be performed; and providing assembly execution means for executing said primitive routines in a sequence and using parameters specified by the data stored in corresponding ones of said databases;

whereby the data in said databases collectively specify the operation of said moveable member.

21. The method of claim 20, wherein an assembly task can be partially specified by storing in said interrelated databases only a portion of the data required to completely specify the assembly task;
said method further including the step of interactively training said robotic assembly system to perform a specified assembly sequence, said interactive training step including the steps of:

executing said primitive routines in a sequence corresponding to a sequence of tasks denoted by the data stored in said interrelated databases;

stopping the execution of said primitive routines when the execution of a primitive routine requires a data value which has not been stored in said interrelated databases;

prompting the operator of said robotic assembly system to enter the data values required to continue performing said specified assembly sequence;

resuming the performance of said specified assembly sequence when said required data values have been stored in said interrelated databases.

* * * * *